United States Patent

Takahashi et al.

[11] Patent Number: 6,144,729
[45] Date of Patent: Nov. 7, 2000

[54] CALL CONNECTION CONTROL METHOD IN EXCHANGE

[75] Inventors: Osamu Takahashi; Toshiaki Kobayashi; Masayuki Honma, all of Yokohama, Japan

[73] Assignee: Fujitsu Limited, Kawasaki, Japan

[21] Appl. No.: 09/040,042

[22] Filed: Mar. 17, 1998

[30] Foreign Application Priority Data

Oct. 2, 1997 [JP] Japan .................................. 9-269419

[51] Int. Cl.⁷ .................................................. H04M 3/42
[52] U.S. Cl. ........................................ 379/211; 379/201
[58] Field of Search ............................. 379/211, 222, 379/201, 207, 220

[56] References Cited

U.S. PATENT DOCUMENTS 5,796,813  8/1998  Sonnenberg ..................... 399/211 X

FOREIGN PATENT DOCUMENTS 2153661  6/1990  Japan .
63204959  8/1998  Japan .

Primary Examiner—Creighton Smith
Attorney, Agent, or Firm—Helfgott & Karas, PC.

[57] ABSTRACT

Disclosed are an exchange which performs call connection control for subscribers in a plurality of areas having different toll numbers, and a method of controlling connection of calls in this exchange. A telephone number translation table is created in accordance with a telephone number structure comprising an internal toll number and internal local office numbers, wherein the internal toll number is a string of numerals shared by toll numbers in the plurality of areas, and the internal local office numbers are numbers obtained by adding a number, which is not shared by the toll numbers in the plurality of areas, onto the beginning of local office numbers that follow the unshared number. The exchange performs switching service control using the telephone number translation table.

9 Claims, 20 Drawing Sheets

FIG.2A

|  | TOLL NUMBER | LOCAL OFFICE NUMBER | |
|---|---|---|---|
| EXCHANGE TEX1 | 045 - | 111 - | XXXX |
|  | 045 - | 112 - | XXXX |
|  | 045 - | 113 - | XXXX |
| 交換局 TEX2 | 044 - | 221 - | XXXX |
|  | 044 - | 222 - | XXXX |
|  | 044 - | 223 - | XXXX |

CONVENTIONAL TELEPHONE NUMBER STRUCTURE

FIG.2B

|  | INTERNAL TOLL NUMBER | INTERNAL OFFICE NUMBER | |
|---|---|---|---|
| ONE EXCHANGE EX | 04 - | 5111 - | XXXX |
|  | 04 - | 5112 - | XXXX |
|  | 04 - | 5113 - | XXXX |
|  | 04 - | 4221 - | XXXX |
|  | 04 - | 4222 - | XXXX |
|  | 04 - | 4223 - | XXXX |

TELEPHONE NUMBER STRUCTURE IN CASE WHERE PLURALITY OF TOLL NUMBERS ARE MANAGED BY ONE EXCHANGE

CALL CONNECTION CONTROL METHOD IN EXCHANGE

BACKGROUND OF THE INVENTION

This invention relates to a call connection control method in an exchange. More particularly, the invention relates to an exchange for performing call connection control for subscribers in a plurality of areas having different toll numbers, as well as to a method of performing call connection control in this exchange.

The number of telephone subscribers accommodated by a single toll number in a sparsely populated area is very small in comparison with that of a city. Accordingly, since deploying an exchange for every toll number would raise cost, it has been sought to control a plurality of toll numbers by a single exchange through use of a remote line concentrator or the like. However, the following problems arise when a plurality of toll numbers are controlled by a single exchange:

1) If an exchange having a control function for only one toll number is provided with a function for controlling a plurality of toll numbers, this will require large-scale expansion of data memory and modification of software.

2) In regard to a service call (to a police station or fire station, etc.) based upon a special service number, the prior art is such that regardless of the toll number area from which the call originates, the call is terminated at a centralized special service number reception center and cannot be terminated at a special service number reception center located in the same area as that of the subscriber that originated the call. Depending upon the customer, however, there is sometimes a desire to terminate the call at a special service number reception center located in the same area as that of the originating subscriber.

3) In a case where different services are provided, the conventional practice is to provide a number for supporting each service. Depending upon the customer, however there is sometimes a desire to receive different services on the basis of subscriber attribute using the same service number. Such requirement cannot be met with the conventional schemes.

Problems 1) through 3) mentioned above will now be described in greater detail.

1) Need for Large-Sale Data Memory and Software Modification

FIG. 18 is a diagram showing the configuration of a telephone network in which toll number areas each have an exchange. A toll number area (045 area) TCA1 has a toll number 045, and a toll number area (044 area) TCA2 has a toll number 044. The 045 area TCA1 includes local areas LA11, LA12 and LA13 having 111, 112 and 113 as local office numbers, respectively, and the 044 area TCA2 includes local areas LA21, LA22 and LA23 having 221, 222 and 223 as local office numbers, respectively. An exchange TEX1 is provided in the 045 area TCA1 and has a telephone number translation table NTT1, and an exchange TEX2 is provided in the 044 area TCA2 and has a telephone number translation table NTT2. A centralized special service number reception center SNR accepts a special service number such as 110 (police station) or 119 (fire station). A special service number reception center SNR1 is provided in the 045 area, and a special service number reception center SNR2 is provided in the 044 area.

If the two toll areas TCA1, TCA2 shown in FIG. 18 were to be controlled by a single exchange, it would be necessary to provide the exchange with the telephone number translation tables NTT1, NTT2. Assume that there are 64 local office numbers in each of the toll number areas and that 10,000 subscribers can be accommodated by each local office. This means that a telephone number translation table is required to have 64×10,000 storage areas per toll number area. Combining two toll number areas would require 2×64×10,000 storage areas. Thus, the memory that stores the telephone number translation table would need have a very large storage capacity.

FIG. 19 is a diagram useful in describing the structure of a telephone number translation table in a case where ten toll number areas are combined. Here a table NTTa accommodating toll numbers, a table NTTb accommodating local office numbers corresponding to one toll number and a table NTTC accommodating subscribers corresponding to one local office number are required to have ten storage areas of 0~9, 64 storage areas of 0~63 and 10,000 storage areas of 0~9999, for a total of 10×64×10,000 storage areas. Thus, in a case where an exchange having a function for controlling only one toll number is provided with a function for controlling a plurality of toll numbers, a large-scale data memory is required.

Further, in a case where the two toll number areas TCA1, TCA2 are controlled by a single exchange EX, as illustrated in FIG. 20, it is necessary to perform call connection control in such a manner that (1) if the calling party and the terminating destination reside in the same toll number area, the call can be placed without transmitting the toll number; (2) if the calling party and the terminating destination reside in different toll number areas, the call cannot be placed unless the toll number is transmitted. For example, in order for a subscriber A to place a call to a terminating destination B residing in the same toll number area (the 045 area) TCA1 as that of subscriber A, subscriber A need only dial the telephone number 112-1001 of subscriber B. In order for subscriber A to place a call to a terminating destination C residing in a toll number area (the 044 area) TCA2 different from that of subscriber A, subscriber A must dial the telephone number 044-221-1001, namely the number onto which the toll number has been added. The reason for performing control in this manner is as follows: If the calling party A calls the number 112-1001 in a case where a subscriber D having the telephone number 112-1001 is present in the 044 area TCA2, the exchange EX may not connect the path between A and B and may instead connect the path between A and D by erroneously. In order to perform such control, a large-scale software modification is required.

2) Necessity to Terminate Call at Special Service Number Reception Center in Same Area In the telephone network shown in FIG. 18, a call is terminated at the centralized special service number reception center SNR regardless of whether the special service number is transmittedfrom toll number area 045 or 044; an originating subscriber cannot be terminated directly at the special service number reception center SNR1 or SNR2 in the same area. More specifically, when subscriber A in toll number area TCA1 of the arrangement shown in FIG. 21 dials a special service number, first the call is terminated at the centralized special service number reception center SNR, after which the call can be placed by establishing a path between subscriber A and the special service number reception center SNR1 in toll number area TCA1 as necessary. With this special service number connecting scheme, however, a subscriber in the 045 area TCA1 will no longer be able to transmit a special service number if it becomes impossible for the exchange TEX1 to communicate with the centralized special service number reception center SNR due an earthquake or for some other reason. Similarly, a subscriber in the 044 area TCA2 will no longer be able to transmit a special service number if it becomes impossible for the exchange TEX2 to communicate with the centralized special service number reception center SNR due an earthquake or for some other reason.

3) Conversion of service number

There is demand for provision of different services, through use of the same service number, based upon the attribute of a subscriber without modifying the service number plan. For example, a three-digit international telephone service number "001" is prefixed to the destination telephone number xxxxxxxxx when an international telephone call is made. When the international telephone call is placed using this number, the registered bank account of the subscriber is billed the fee at regular intervals. However, if a three-digit number "002" is prefixed to the destination number and a credit card number is added onto the end of the destination number when the international telephone call is made, a bank account in accordance with the credit card number will be billed for the call. This is a service now available and is convenient when one is on a journey and uses another person's telephone to make an overseas call. However, there are certain subscribers who wish to use the number "001" for the latter service as well. More specifically, for a certain subscriber the special service number 001 is for a domestic telephone service through which an account conforming to this subscriber's credit card number is billed for a telephone call. For a different subscriber, however, the service number 001 is for an international telephone service in which the account billed is that for which a contract has been made with the telephone company.

Thus, in a case where similar services are available, there is a need to provide different services, even though the service numbers are identical, on the basis of subscriber attributes.

Thus, in a case where a plurality of toll number areas are controlled by a single exchange, the prior art is such that a large-scale data memory is required as well as large-scale modification of software.

Further, if it becomes impossible for an originating subscriber and a centralized special service number reception center to communicate, a problem which arises in the prior art is that a call from this originating subscriber cannot be terminated at the special service number reception center located in the same area.

Further, though there are cases where certain subscribers wish to receive different services even though the service number used is the same, the prior art is incapable of satisfying this need.

SUMMARY OF THE INVENTION

Accordingly, a first object of the present invention is to suppress an increase in required memory capacity and control a plurality of toll numbers by a single exchange through only a simple modification of software.

A second object of the present invention is to arrange it so that a call from an originating subscriber can be terminated directly at a special service number reception center located in the same area even if communication with a centralized special service number reception center becomes impossible.

A third object of the present invention is to arrange it so that different services may be received depending upon the subscriber even though the service numbers are identical.

In accordance with the present invention, the first object is attained by an exchange having (1) a telephone number translation table created in accordance with a telephone number structure comprising an internal toll number and internal local office numbers, wherein the internal toll number is a number segment shared by toll numbers in a plurality of areas having different toll numbers, and the internal local office numbers are numbers obtained by adding a number segment, which is not shared by the toll numbers in the plurality of areas, onto local office numbers that follow the number segment not shared, and (2) a controller for performing switching service control using the telephone number translation table.

In accordance with the present invention, the first object is attained by an exchange having (1) a telephone number translation table created in accordance with a telephone number structure comprising an internal toll number and internal local office numbers, the translation table holding, in correspondence with local office numbers, toll number add-on implementation data indicating whether a toll number is to be added onto a local office number transmitted from a telephone, (2) a subscriber table for holding subscriber data to which have been added normalized office codes specifying local areas in which subscribers reside, (3) a normalized office code—toll number conversion table for storing toll numbers of local areas specified by normalized office codes, and (4) a controller for referring to the toll number add-on implementation data in the translation table when a call has been made from a telephone using a local office number, determining whether a toll number is to be added onto this local office number, obtaining the toll number of the local area in which the calling party resides from the subscriber table and normalized office code—toll number conversion table if the toll number is to be added onto the local office number, and executing call connection processing upon adding the obtained toll number onto the beginning of the local office number received from the telephone.

In accordance with the present invention, the first object is attained further by causing the controller to determine whether a calling party and a called party reside in the same toll number area, execute call connection control if the calling party and called party reside in the same toll number area, and providing voice guidance prompting dialing of the telephone number upon adding on a toll number if the calling party and call terminating destination do not reside in the same toll number area.

In accordance with the present invention, the second object is attained by an exchange having (1) a telephone number translation table created in accordance with a telephone number structure comprising an internal toll number and internal local office numbers, the translation table holding, in correspondence with special service numbers, toll number add-on implementation data indicating whether a toll number is to be added onto a special service number transmitted from a telephone, (2) a subscriber table for holding subscriber data to which have been added normalized office codes specifying local areas in which subscribers reside, (3) a normalized office code—toll number conversion table for storing toll numbers of local areas specified by normalized office codes, and (4) a controller for referring to the toll number add-on implementation data in the translation table when a call has been made from a telephone using a special service number, determining whether a toll number is to be added onto this special service number, obtaining the toll number of the local area in which the calling party resides from the subscriber table and normalized office code—toll number conversion table if the toll number is to be added onto the local office number, and executing call connection processing upon adding the obtained toll number onto the beginning of the special service number.

In accordance with the present invention, the third object is attained by an exchange having (1) a telephone number translation table created in accordance with a telephone number structure comprising an internal toll number and internal local office numbers, the translation table holding, in correspondence with special service numbers, number conversion implementation data indicating whether a special service number transmitted from a telephone is capable of being converted to another number for subscriber support, (2) a subscriber table for holding subscriber data to which have been added the other numbers or search data for retrieving the other numbers, and (3) a controller for referring to the number conversion implementation data in the translation table when a special service number has been entered from a telephone, determining whether this special service number is capable of being converted to another number and, if the conversion is possible, executing call connection processing upon changing the special service number by the other number, or by a number specified by the search data, that has been added to the subscriber data of the calling party.

Other features and advantages of the present invention will be apparent from the following description taken in conjunction with the accompanying drawings.

BRIEF DESCRIPTION OF THE DRAWINGS

FIGS. 2A and 2B are diagrams useful in describing the make-up of telephone numbers;

DESCRIPTION OF THE PREFERRED EMBODIMENT (a) Configuration of telephone network FIG. 1 is a diagram showing the configuration of a telephone network according to the present invention. Here a single common exchange is provided for a plurality of areas (toll number areas) having different toll numbers.

Figure 1:
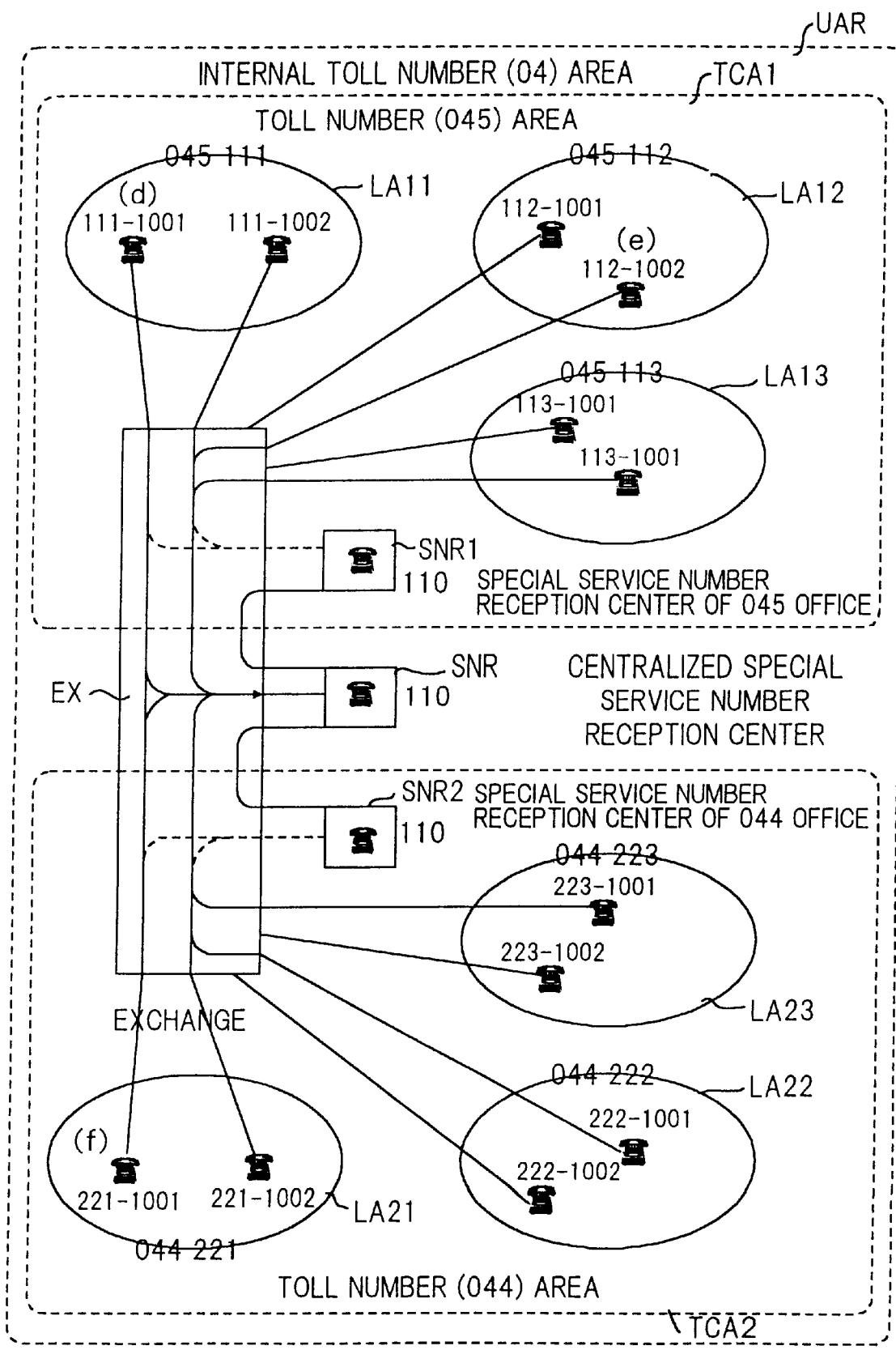
FIG. 1 is a diagram showing the configuration of a telephone network according to the present invention having a single common exchange for a plurality of toll number areas.

Shown in FIG. 1 are the toll number area (045 area) TCA1 having the toll number 045, the toll number area (044 area) TCA2 having the toll number 044, the local areas LA11, LA12 and LA13 located within the 045 area and having 111, 112 and 113 as local office numbers, respectively, and the local areas LA21, LA22 and LA23 located within the 044 area having 221, 222 and 223 as local office numbers, respectively. UAR represents a unified area obtained by unifying the toll number area (045 area) TCA1 and the toll number area (044 area) TCA2.

An exchange EX is the common exchange provided in the united area UAR obtained by unifying the toll number area (045 area) TCA1 and the toll number area (044 area) TCA2. The centralized special service number reception center SNR accepts the special service number 110, which is for calling police station. The special service number reception center SNR1 is provided in the 045 area, and the special service number reception center SNR2 is provided in the 044 area.

Figure 18:
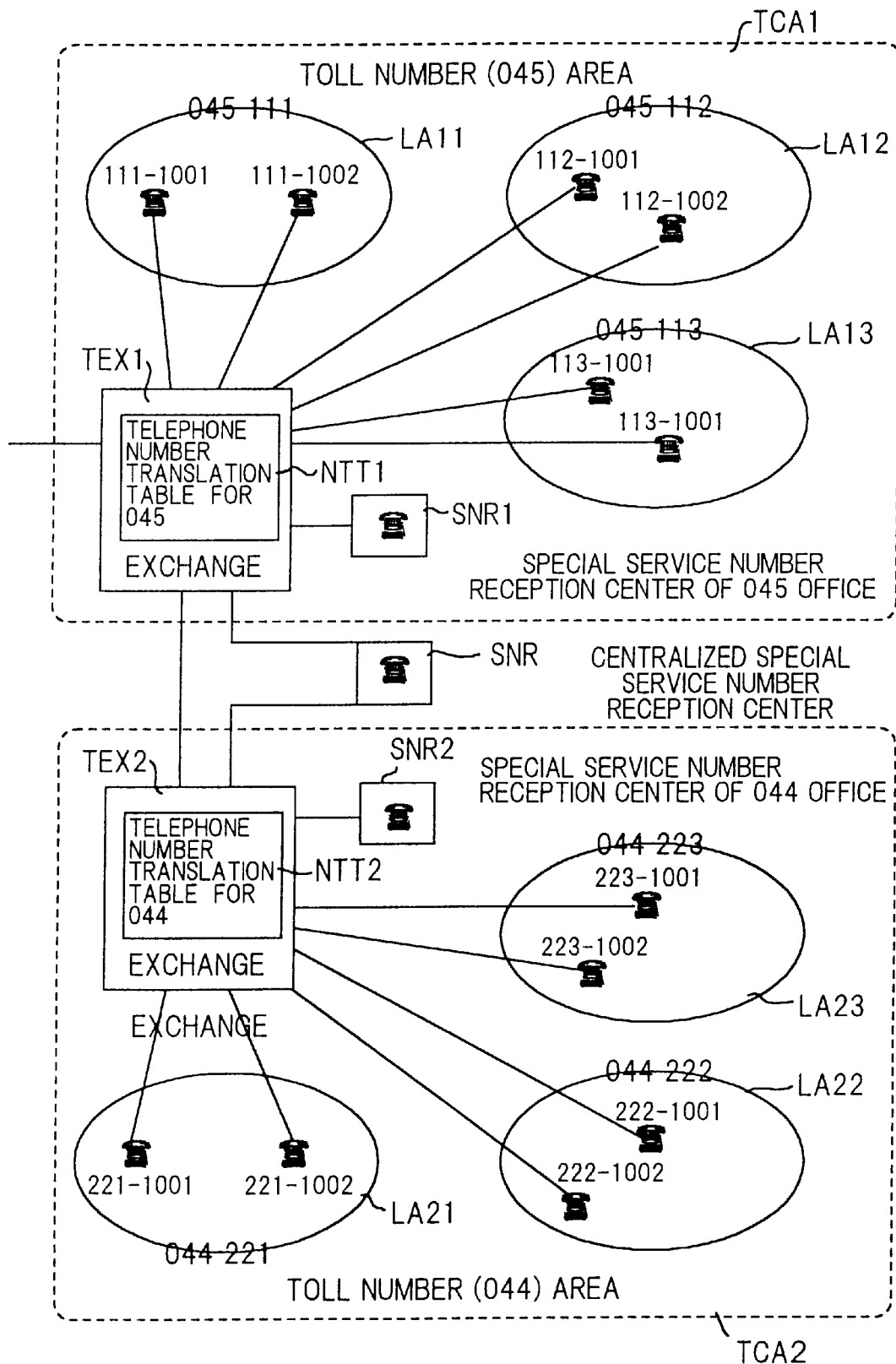
FIG. 18 is a diagram showing the configuration of a telephone network according to the prior art in which each of a plurality of toll number areas is provided with its own exchange.

(b) FIGS. 2A and 2B are diagrams useful in describing the makeup of telephone numbers in the united area UAR obtained by unifying the toll number area (045 area) TCA1 and the toll number area (044 area) TCA2. FIG. 2A shows the makeup of telephone numbers according to the prior art (see FIG. 18), and FIG. 2B is for describing the makeup of telephone numbers according to the present invention.

According to the present invention, (1) a number segment "04" shared by the toll numbers 045, 044 in the respective toll number areas TCA1, TCA2 is adopted as an internal toll number, (2) numbers 5111, 5112, 5113 are adopted as internal local office numbers, these being obtained by adding an unshared number segment "5" in the toll number area 045 onto the beginning of the local office numbers 111, 112, 113 that follow the unshared number "5", and (3) numbers 4221, 4222, 4223 are adopted as internal local office numbers, these being obtained by adding an unshared number segment "4" in the toll number area 044 onto the beginning of the local office numbers 221, 222, 223 that follow the unshared number "4". The exchange EX creates a telephone number translation table (not shown) in accordance with the telephone number structure comprising the internal toll number area "04" and the internal local office numbers 5111~4223.

Figure 3:
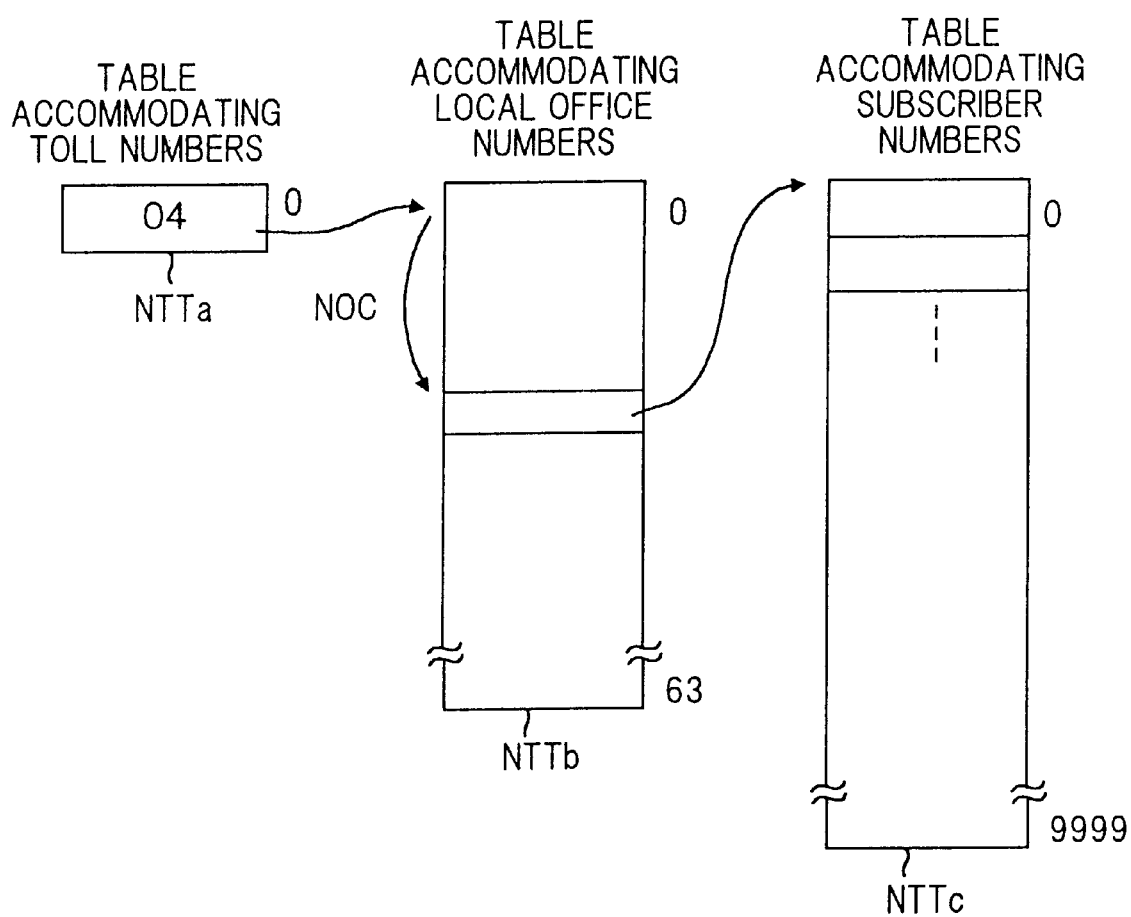
FIG. 3 is a diagram useful in describing the structure of a telephone number translation table.
Figure 19:
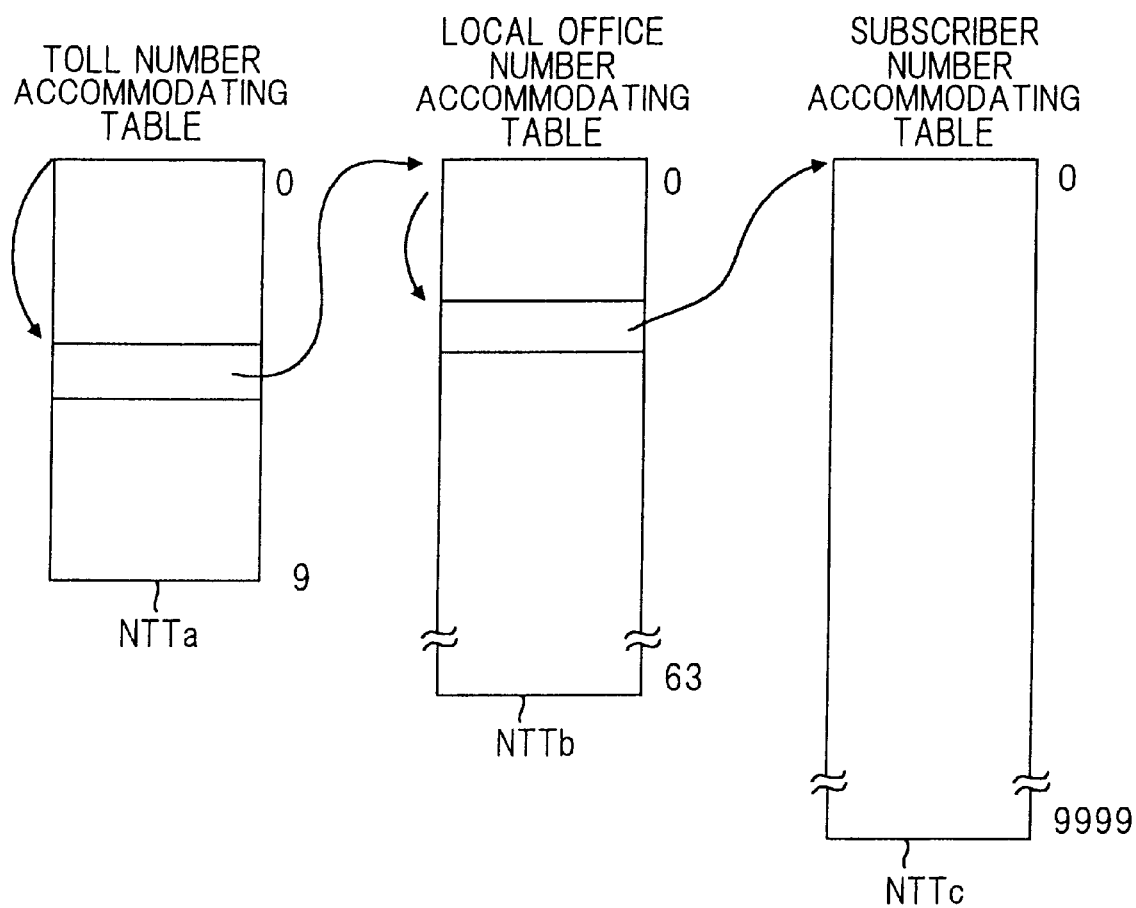
FIG. 19 is a diagram useful in describing the structure of a telephone number translation table according to the prior art.
Figure 20:
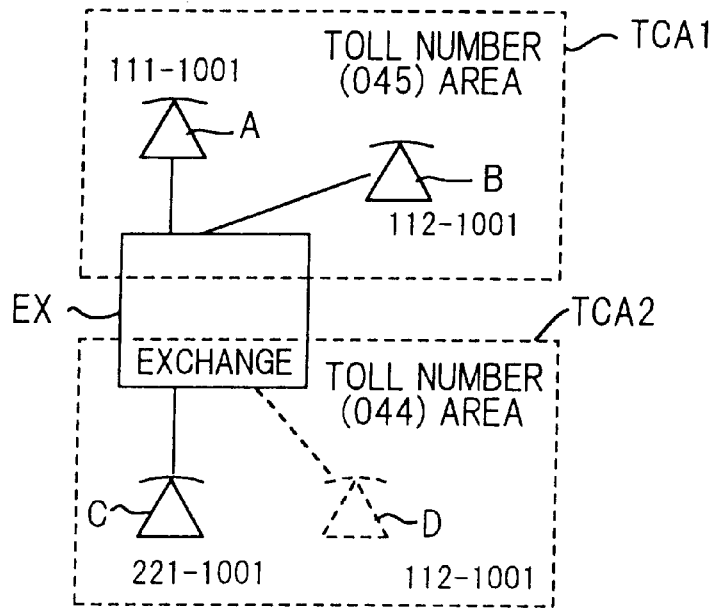
FIG. 20 is a diagram useful in describing prior-art call connection processing required in a case where toll number areas are combined.
Figure 21:
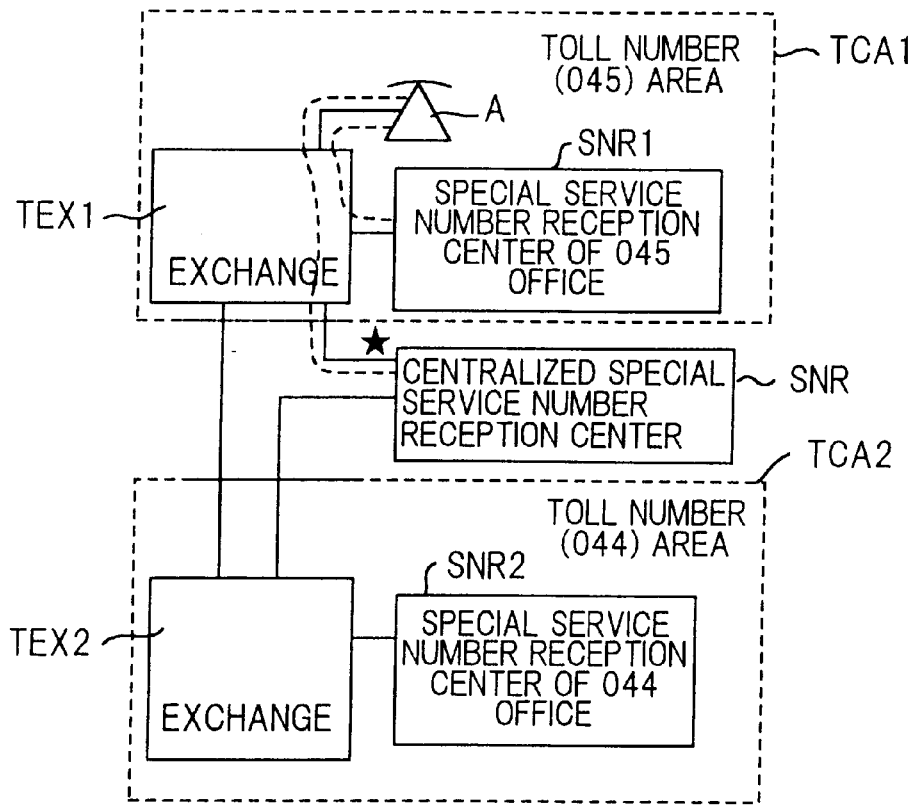
FIG. 21 is a diagram useful in describing a problem which arises when a special service number is dialed according to the prior art.

FIG. 3 is a diagram useful in describing the structure of a telephone number translation table NTT in accordance with the telephone number structure of the present invention. Since a plurality of toll numbers for a small number of telephone subscribers in a sparsely populated area are controlled by a single exchange, it will suffice to assure 64×10,000 as the number subscribers. Let the number of local office numbers in the united area (whose internal toll number is 04) UAR be 64, and let the maximum number of subscribers capable of being accommodated by each local office number be 10,000. In such case the telephone number translation table NTT is required to have 64×10,000 storage areas for one internal toll number. By contrast, with the telephone number structure of the prior art shown in FIG. 19, 2×64×10,000 storage areas would be required in the case where two toll number areas are united, and n×64×10,000 storage areas would be required in general in a case where n-number of toll number areas are united.

(c) Construction of exchange

Figure 4:
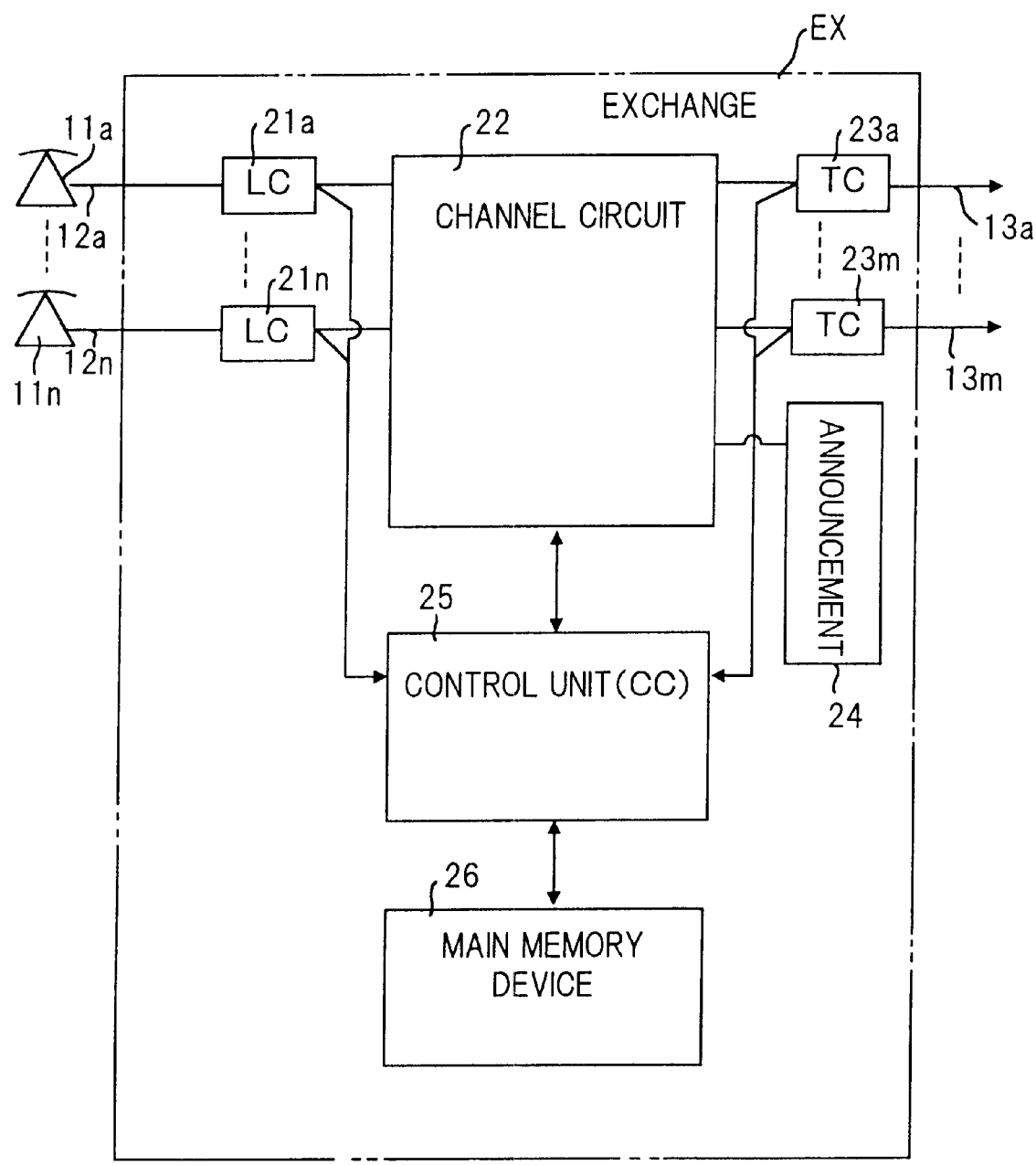
FIG. 4 is a block diagram showing the structure of an exchange.

FIG. 4 is a block diagram showing the construction of an exchange EX according to the present invention. The exchange EX accommodates subscriber devices (telephone) 11a~11n via telephone lines (subscriber lines) 12a~12n, respectively, and has trunks 13a~13m. The exchange EX includes subscriber circuits (LC) 21a~21n connected to respective ones of the subscriber devices, a channel circuit 22 constituted by spatial switches or time switches, trunk circuits (TC) 23a~23m connected to respective ones of the trunk lines, an announcement device 24 which provides a variety of voice information for guidance purposes, a control unit 25 for controlling the channel circuit 22 to connect and disconnect paths, and for performing other call control operations, and a main memory device 26 for storing various data.

Figure 5:
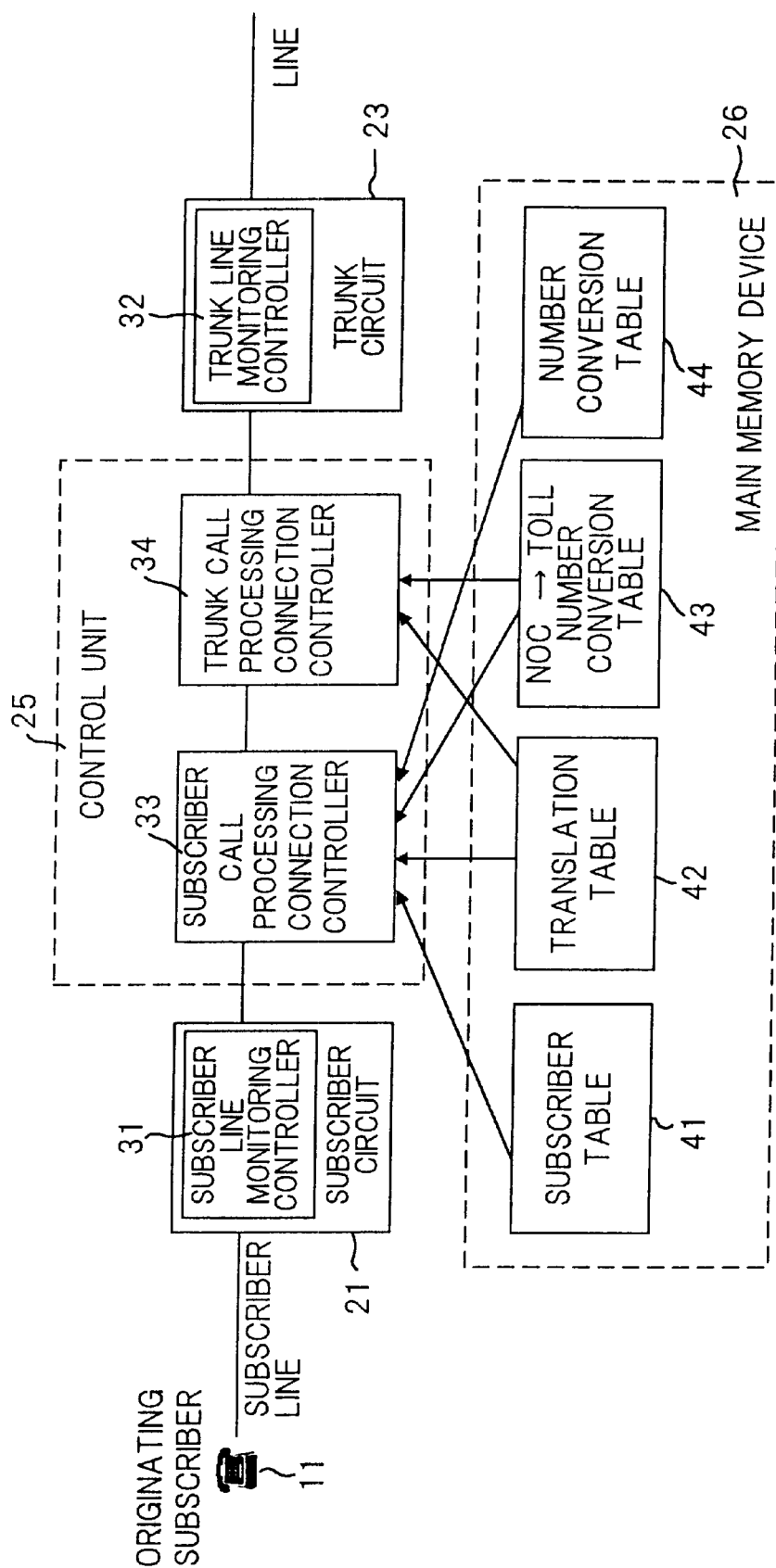
FIG. 5 is a diagram showing the functional construction of principal portions of the exchange.

FIG. 5 is a diagram showing the functional construction of principal portions of the exchange. Shown in FIG. 5 are a subscriber device (telephone) 11, a subscriber circuit 21, a trunk circuit 23, the control unit 25 and the main memory device 26. The subscriber circuit 21 is provided with a subscriber line monitoring controller 31 for detecting on/off hook operations at the subscriber (telephone) 11 and received numbers from the subscriber 11. The trunk circuit 23 is provided with a trunk line monitoring controller 32 for detecting call origination/disconnect from the trunk and for receiving numbers. The control unit 25 includes a subscriber call processing connection controller 33 for performing status management that accompanies subscriber call set-up/release and for executing translation/connection processing of numbers received from subscribers, and a trunk call processing connection controller 34 for performing call status management that accompanies connection using the trunk and for executing translation/connection processing of numbers received from the trunk.

The main memory device 26 includes a subscriber table 41 for storing, in correspondence with subscriber numbers, e.g., (1) status of telephone fee payment of the subscriber, (2) contracted services, (3) a normalized office code (NOC) which specifies the local area in which the subscriber resides, and (4) subscriber data such as a number conversion information index value. The main memory device 26 further includes a telephone number translation table (referred to simply as a "translation table" below) 42 created in accordance with the telephone number structure comprising an internal toll number and internal local office numbers described above in connection with FIG. 2, a normalized office code (NOC)→toll number conversion table 43 for storing, in correspondence with normalized office codes, (1) toll numbers and (2) internal local office numbers, and a number conversion table 44 which, in a case where a service number is converted to another number for subscriber support, stores this other number in an area indicated by the number conversion information index value of the subscriber.

(d) Translation table

Figure 6:
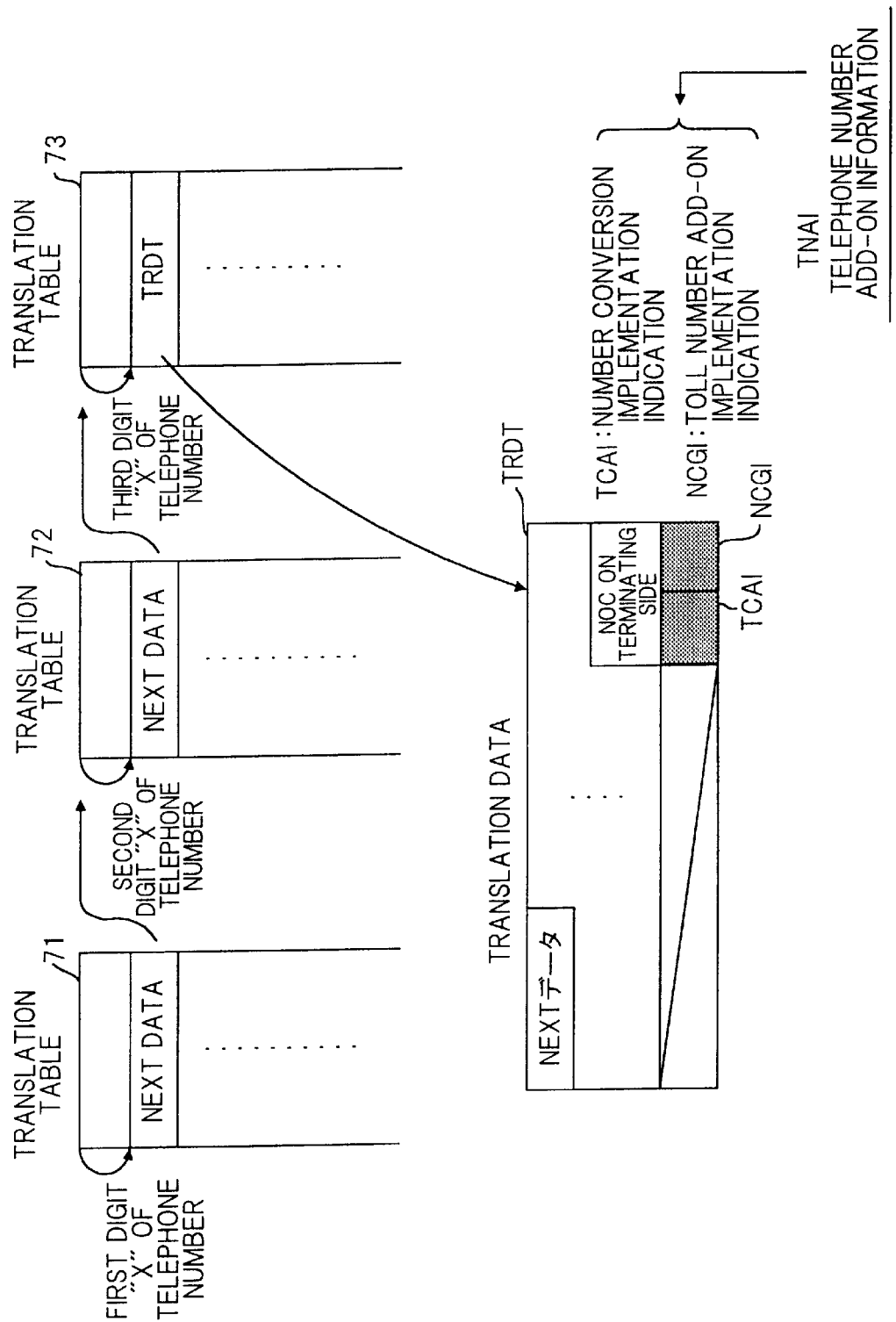
FIG. 6 is a table useful in describing a translation table.

The translation table 42 has tables T1~Tn corresponding to the digits of a telephone number, with only tables T1, T2 and T3 being illustrated in FIG. 6. When a number has been entered, each table indicates, on the basis of the entered number, whether to wait for the number of the next digit. That is, if the next number is to be awaited, then the table indicates the leading position of the table of the next digit. If the next number is not to be awaited, as when an improbable number is entered by an entry error, then the table outputs this fact, causing subsequent translation to halt. Further, translation data TRDT is stored in a prescribed translation table in correspondence with a toll number or local office number, special service number or service number.

For example, translation data TRDT, which contains the following information, is held in the translation table T3 of the third digit in correspondence with a local office number, special service number of service number:

(1) the next table position (NEXT data);

(2) normalized office code (NOC on terminating side);

(3) a toll number add-on implementation indication NCGI, which indicates whether toll number is to be added onto a local office number or service number that has been transmitted from a telephone; and (4) a number conversion implementation indication TCAI, which indicates whether a service number that has been transmitted from a telephone is capable of being converted to another number for subscriber support. The toll number add-on implementation indication NCGI and number conversion implementation indication TCAI shall be referred to collectively as telephone number add-on identification information TNAI.

(e) Normalized office code→toll number conversion table

Figure 7:
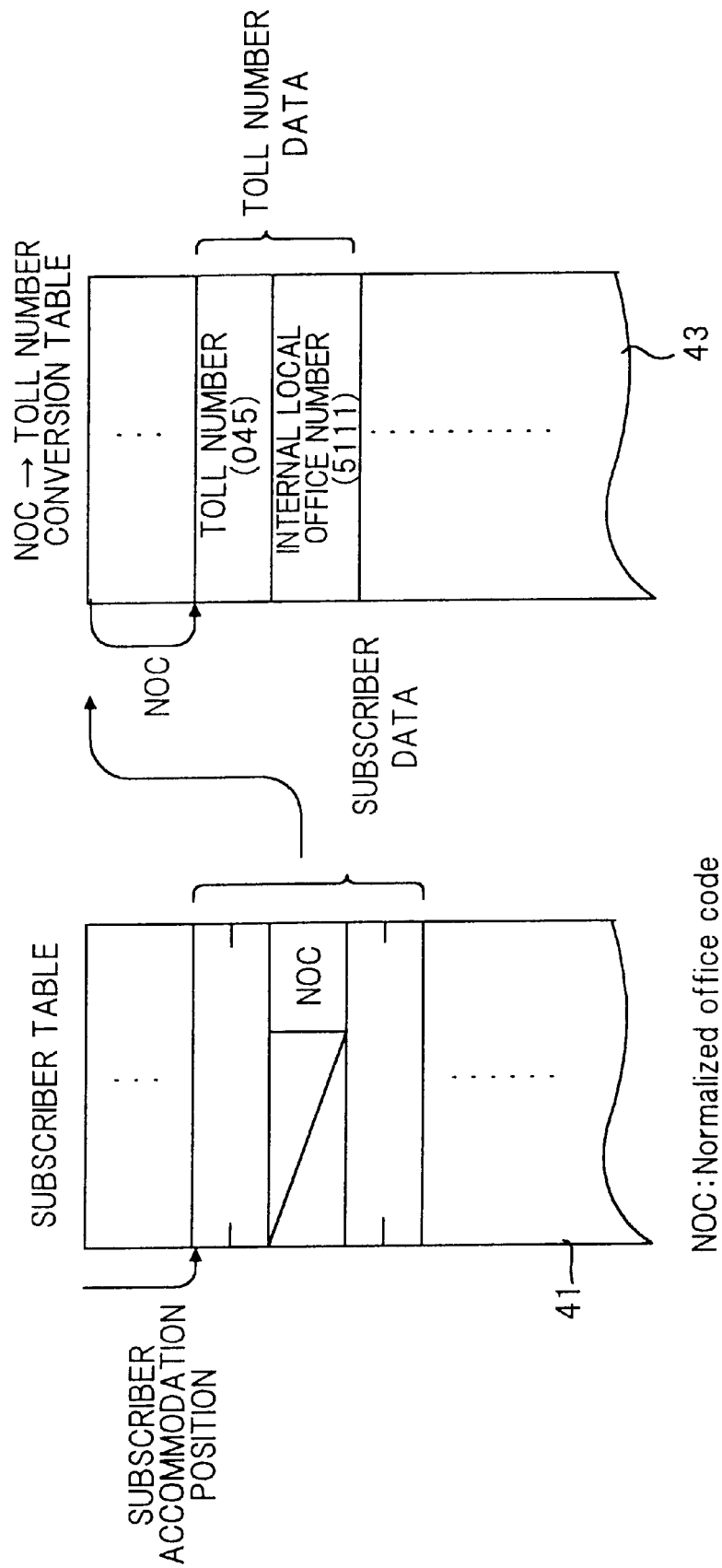
FIG. 7 is a diagram useful in describing a normalized office code—toll number conversion table.

As shown in FIG. 7, normalized office code→toll number conversion table 43 stores the following in correspondence with normalized office codes (NOCs):

(1) a toll number of the area indicated by the normalized office code (NOC); and (2) an internal local office number in this area.

The normalized office code→toll number conversion table 43 is referred to when a toll number is added onto a local office number that has been transmitted from a telephone. More specifically, if the toll number add-on implementation indication NCGI (FIG. 6) is "1", the normalized office code (NOC) of the local area in which the calling party resides is obtained from the subscriber table 41, the toll number of the local area indicated by this normalized office code (NOC) is obtained from the normalized office code→toll number conversion table 43, and this toll number is added onto the local office number that has been transmitted from the telephone.

(f) Number conversion table

Figure 8:
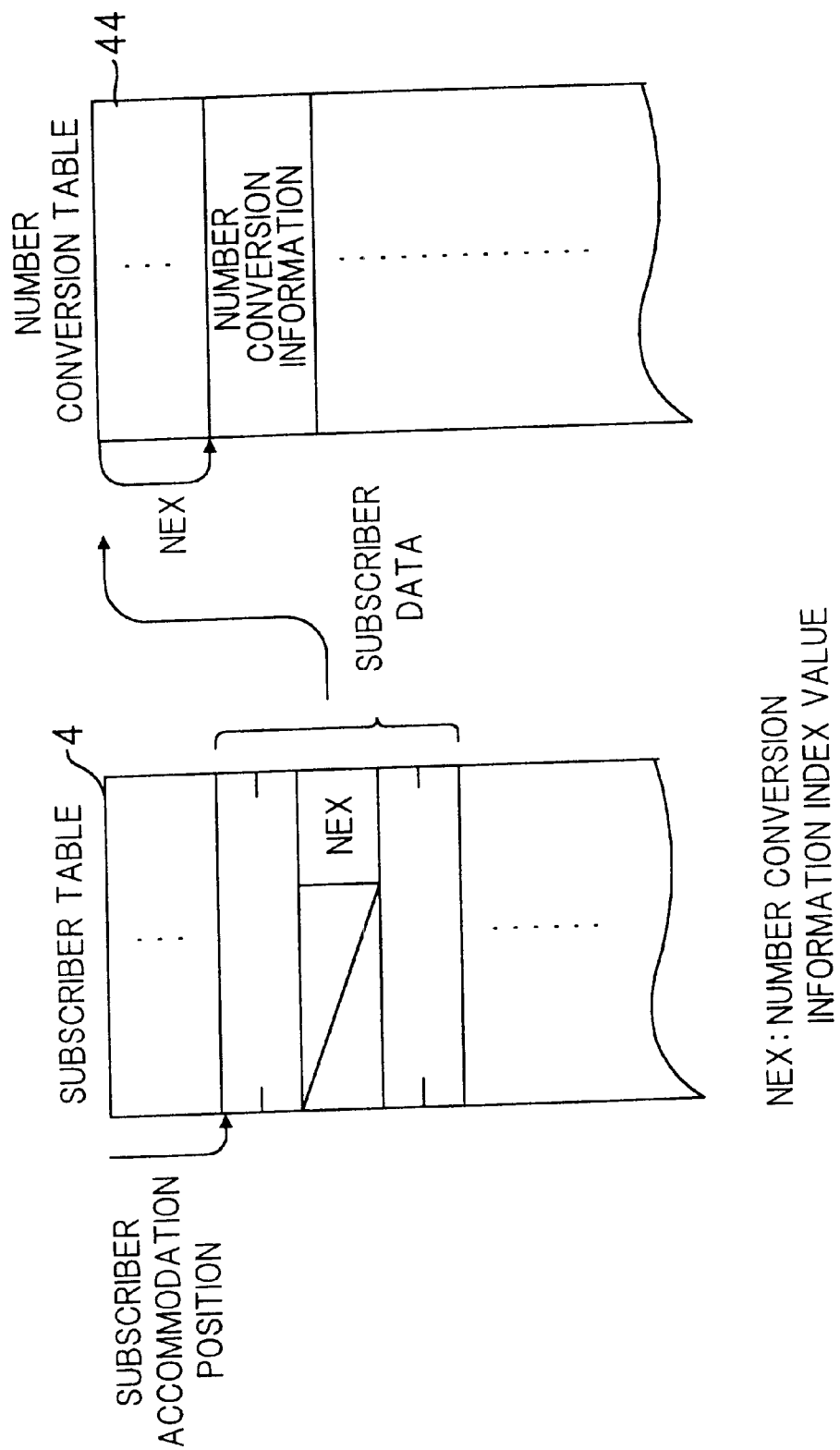
FIG. 8 is a diagram useful in describing a number conversion table.

As shown in FIG. 8, the number conversion table 44 stores the service number (number conversion information) for subscriber support in correspondence with a number conversion information index value (NEX). More specifically, in a case where a service number is to be converted to another number for subscriber support, the service number (number conversion information) of this other service number is stored in the area indicated by the number conversion information index value (NEX) of the subscriber.

The number conversion table 44 is referred to when a service number that has been transmitted from a telephone is converted to another service number for subscriber support. More specifically, if the number conversion implementation indication TCAI (FIG. 6) of the service number transmitted from a telephone is "1", the number conversion information index value NEX of the calling party is obtained from the subscriber table 41, the number conversion information (service number) indicated by the index value NEX is obtained from the number conversion table 44 and the service number transmitted from the telephone is changed by this service number.

(g) Call connection processing

Figure 9:
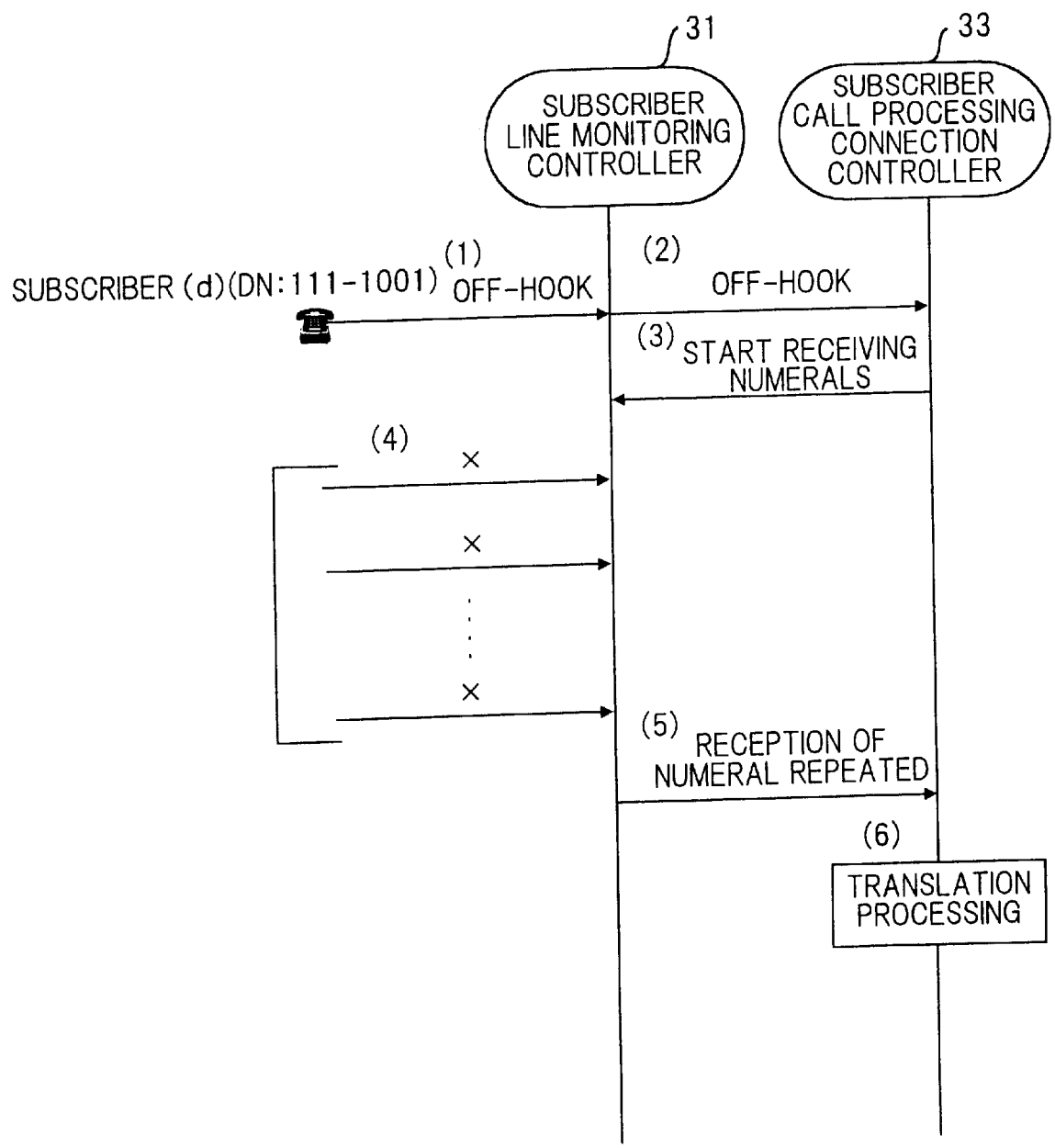
FIG. 9 is a diagram useful in describing an event sequence from the placing of a call to execution of translation processing.
Figure 10:
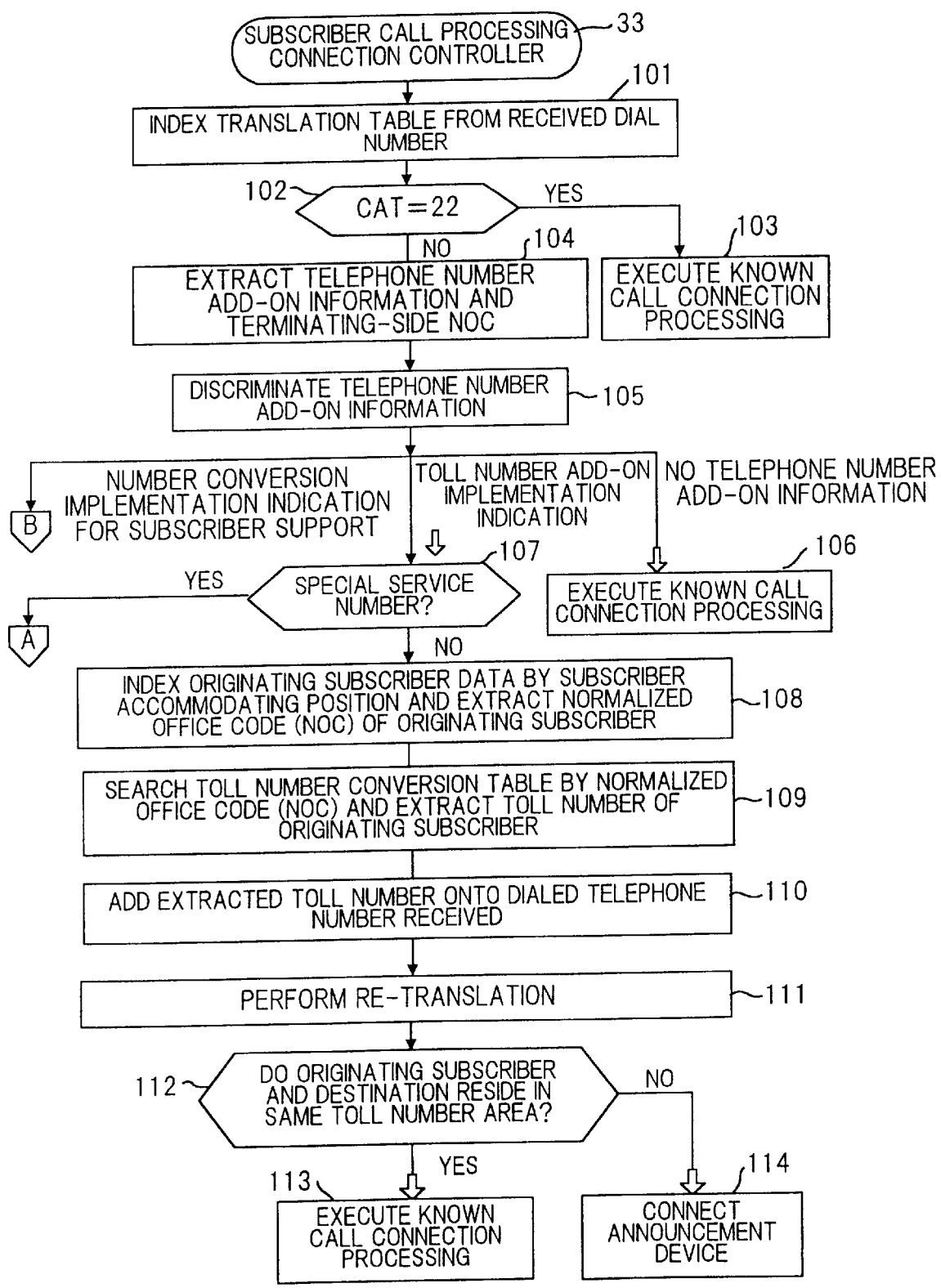
FIG. 10 is a flowchart of call connection processing (in which a local office number is dialed)
Figure 11:
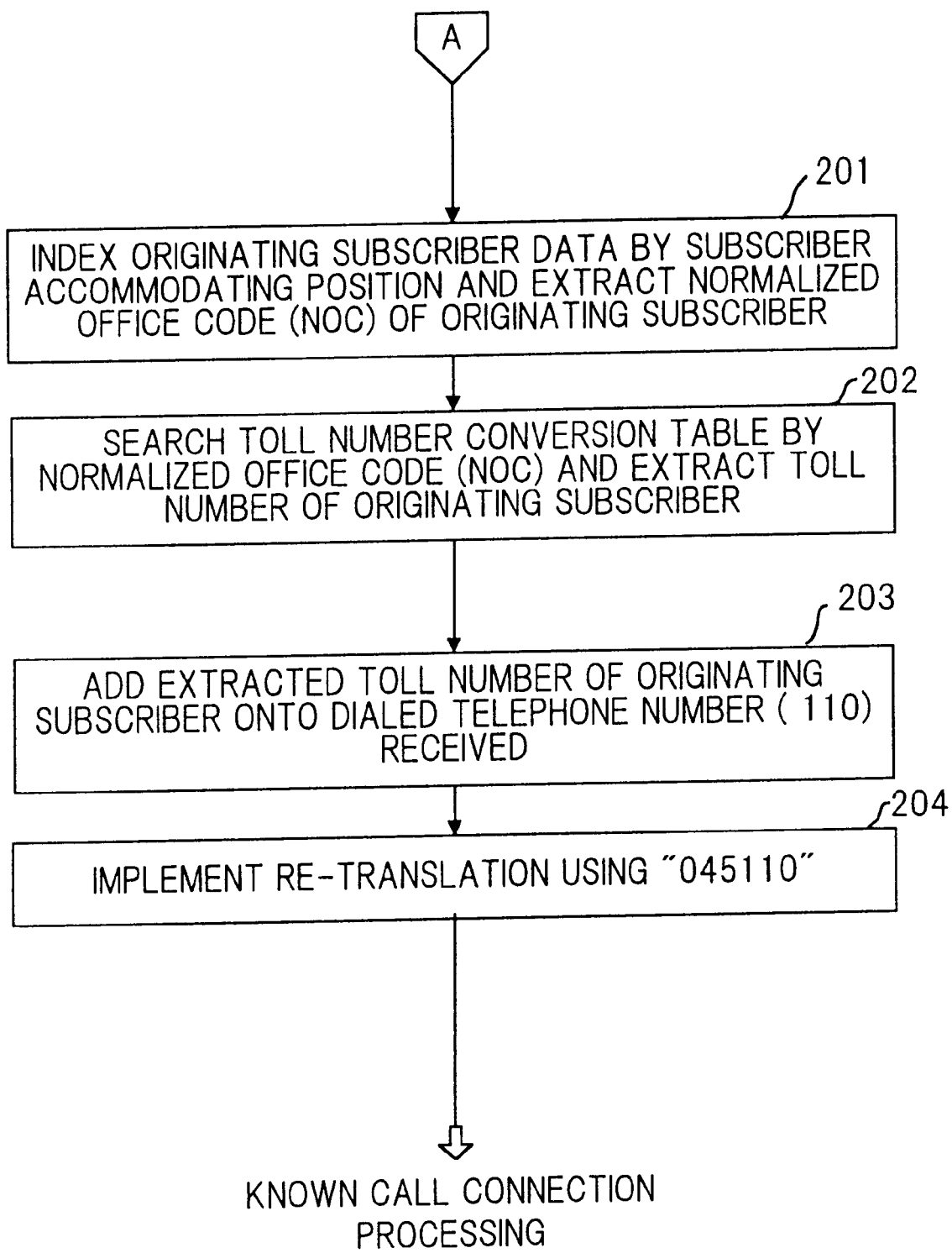
FIG. 11 is a flowchart of call connection processing (in which a special service number is dialed)
Figure 12:
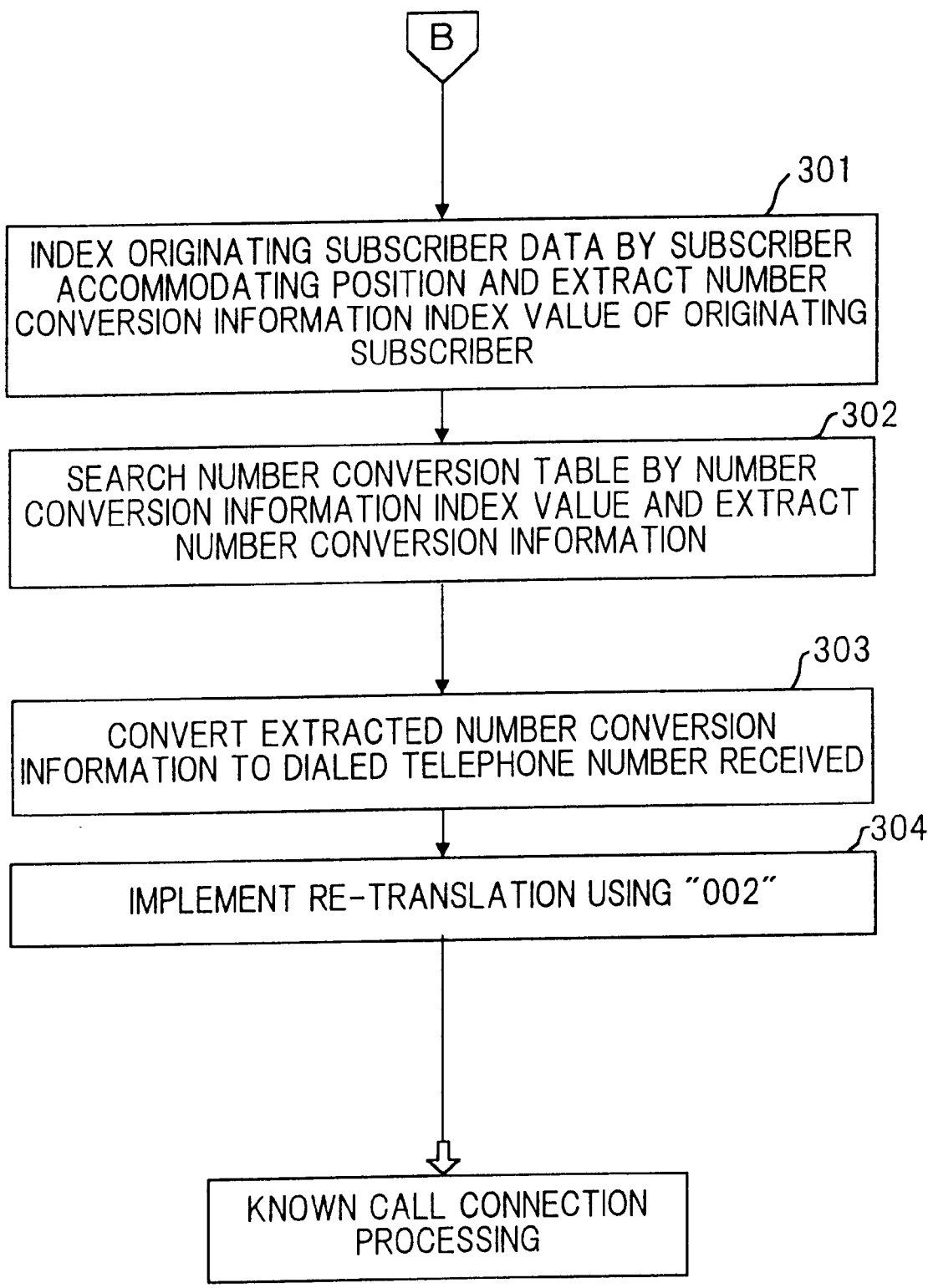
FIG. 12 is a flowchart of call connection processing (in which a service number is dialed)

FIG. 9 is a diagram useful in describing an event sequence from dialing in of a number by a subscriber to execution of translation processing, and FIGS. 10 through 12 are flowcharts of call connection processing according to the present invention, in which FIG. 10 is a flowchart of processing in a case where a local office number is dialed, FIG. 11 a flowchart of processing in a case where a special service number (a number for calling a police station) is dialed, and FIG. 12 a flowchart of processing in a case where a service number is dialed.

When a subscriber (d) of subscriber number 111-1001 in FIG. 1 takes the receiver off the hook ((1) in FIG. 9), this state is detected by the subscriber line monitoring controller 31 (FIG. 5) and the subscriber call processing connection controller 33 is so notified by the controller 31 (2). The subscriber call processing connection controller 33 instructs the subscriber line monitoring controller 31 to start receiving numerals (3), in response to which the subscriber line monitoring controller 31 receives the numerals dialed in by the subscriber (d) (4) and inputs these numerals to the subscriber call processing connection controller 33 (5). The subscriber call processing connection controller 33 thenceforth subjects the received numerals to translation processing (6) and executes processing conforming to the results of translation. FIGS. 10 through 12 are flowcharts of processing that follows translation. It should be noted that in a case where the originating subscriber (d) communicates with a subscriber (e) of subscriber number 112-1001 and a subscriber (f) of subscriber number 221-1001, it is assumed that the subscriber (d) does not dial toll numbers (045, 044), directly dials the special service number 110 when the police station is called, and dials "001 XXXXXXXX" for international telephone service.

Figure 13:
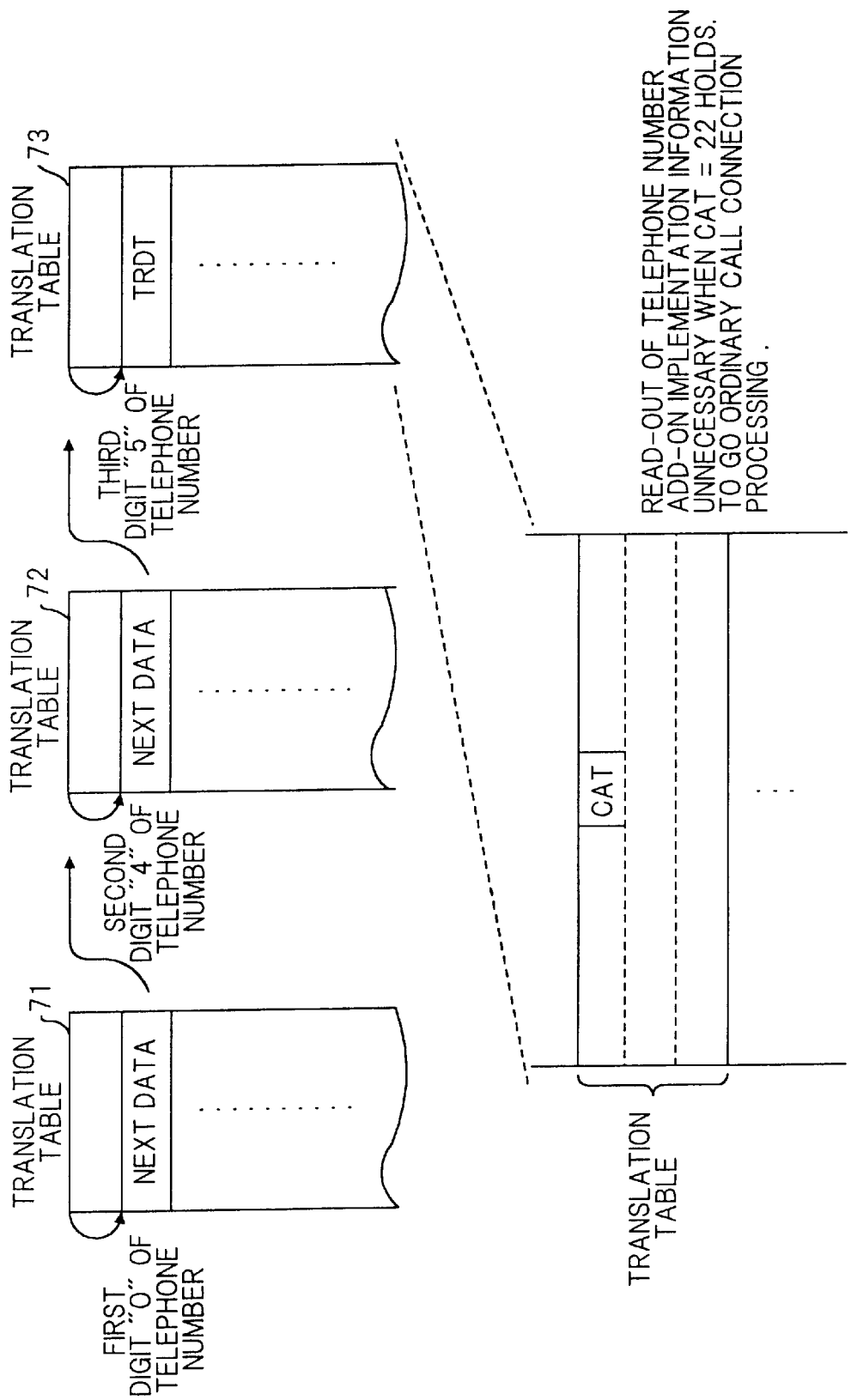
FIG. 13 is a diagram useful in describing an expansion of translation data when 045 is dialed.
Figure 14:
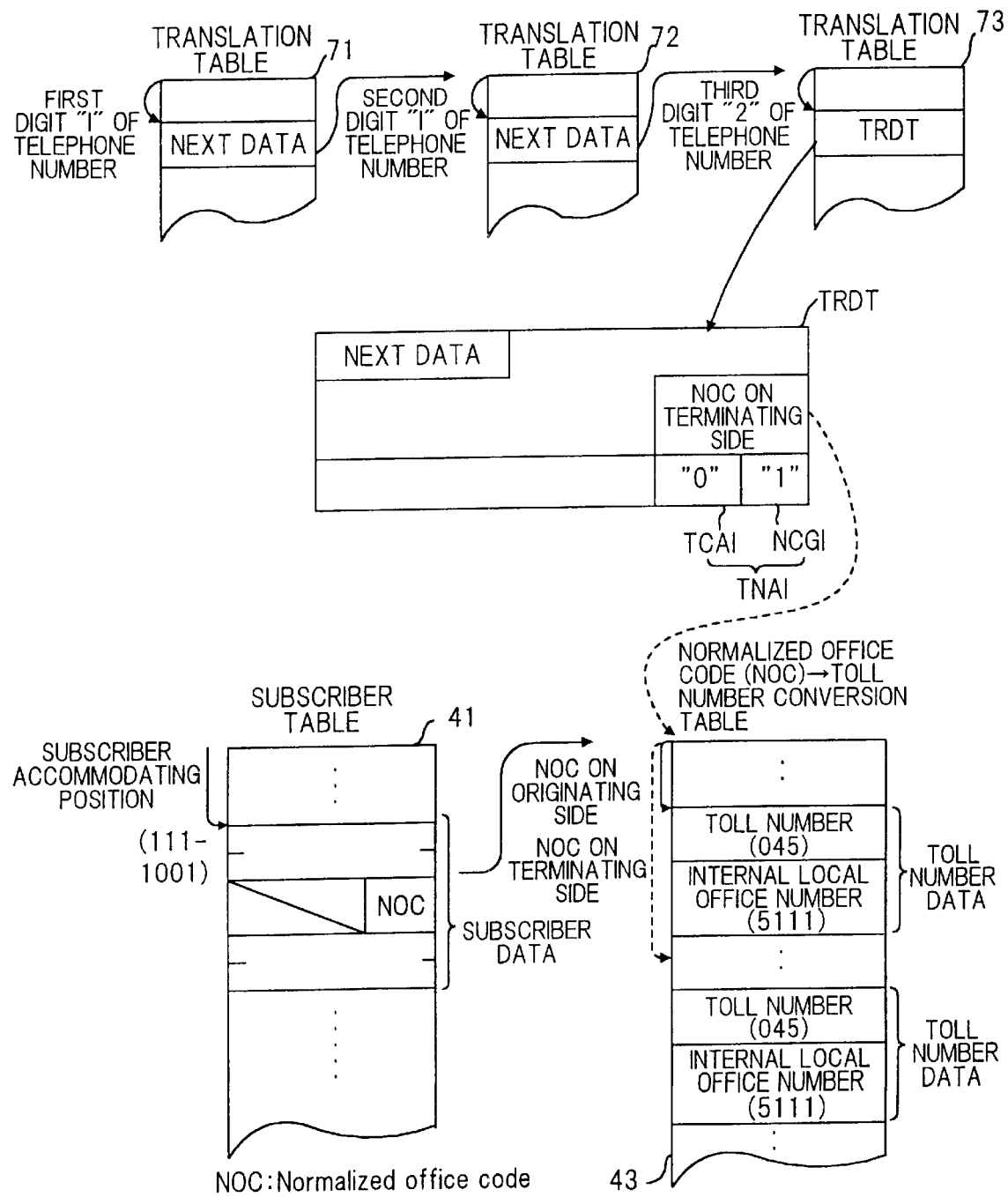
FIG. 14 is a diagram useful in describing call connection processing when 112 is dialed.
Figure 15:
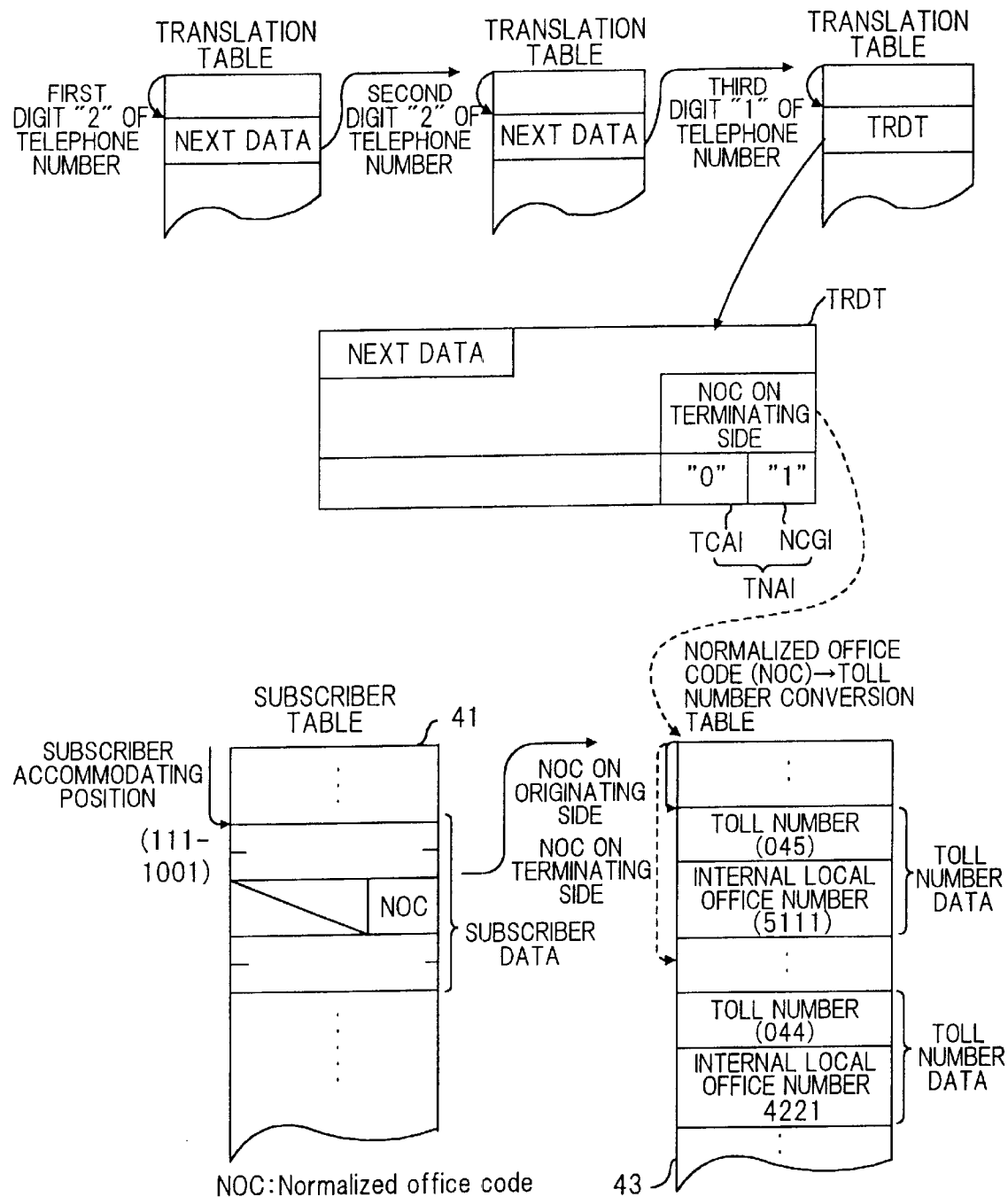
FIG. 15 is a diagram useful in describing call connection processing when 221 is dialed.
Figure 16:
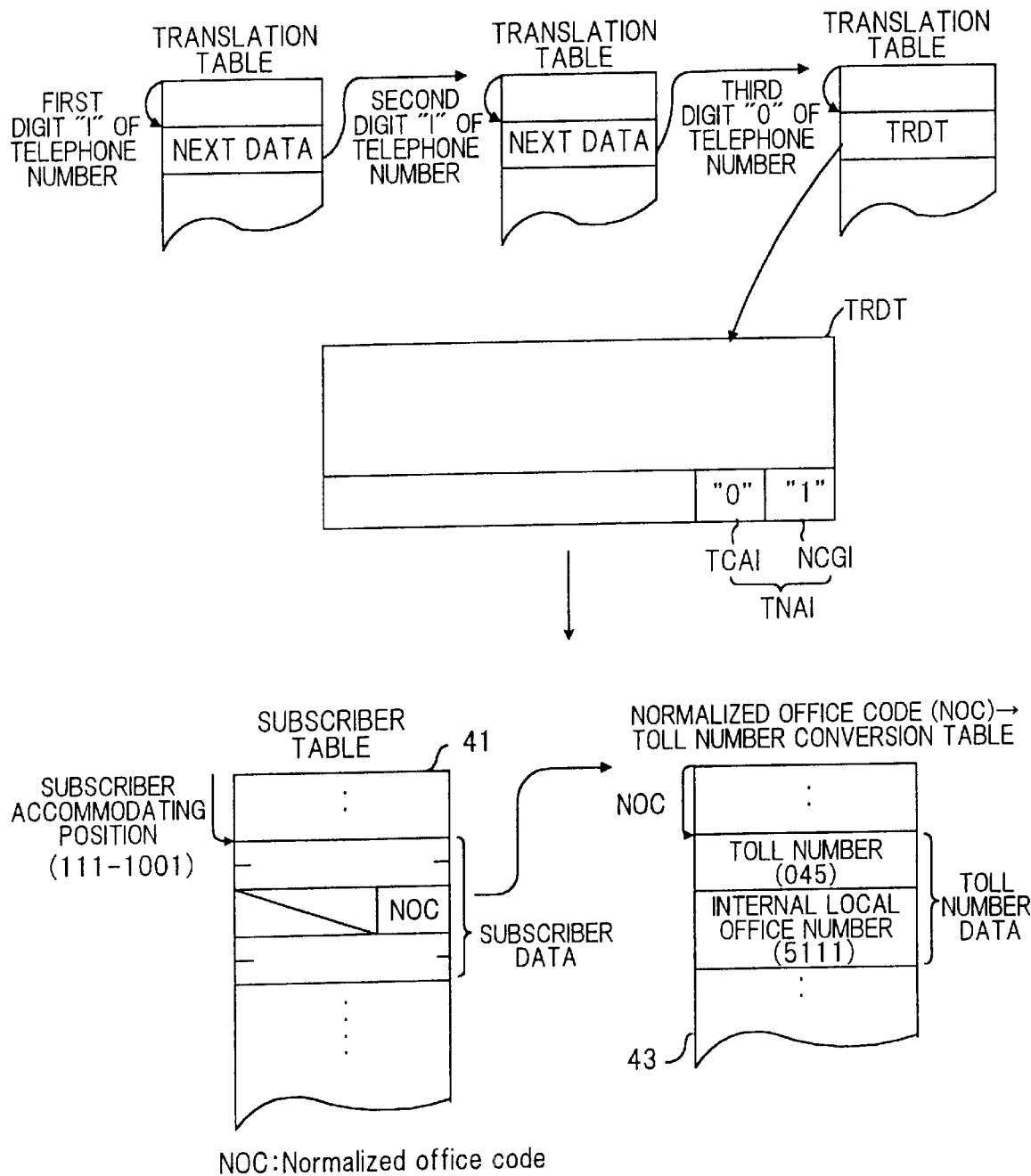
FIG. 16 is a diagram useful in describing call connection processing when 110 is dialed.
Figure 17:
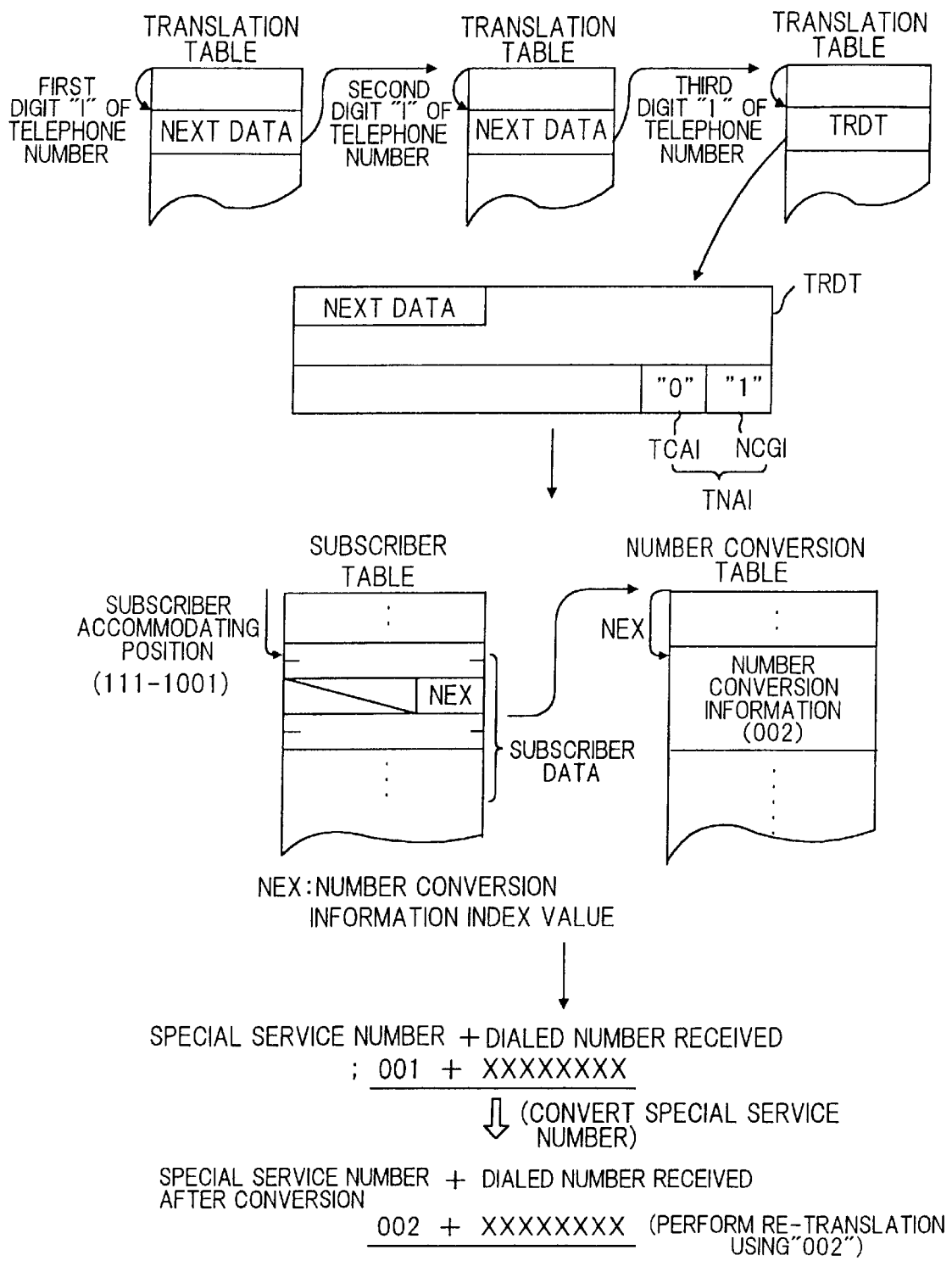
FIG. 17 is a diagram useful in describing call connection processing when 001 is dialed.

On the basis of the dialed number that has been received, the subscriber call processing connection controller 33 performs indexing of the translation table 42 (step 101 in FIG. 10) and determines whether CAT=22 holds true in the translation data TRDT obtained by entry of the first three digits (step 102). As shown in FIG. 13, CAT in the translation data TRDT in a case where the first three digits are the toll number 045 or 044 will be 22. This means that step 102 is a step for determining whether the first three digits are a toll number.

If CAT=22 is found to hold, then the subscriber call processing connection controller 33 executes known call connection processing on the basis of the entered telephone number (step 103). If CAT=22 is found not to hold, however, then the subscriber call processing connection controller 33 extracts the telephone number add-on identification information TNAI from the translation data TRDT (see FIGS. 14 through 17) (step 104) and discriminates the "1", "0" logic of the toll number add-on implementation indication NCGI and number conversion implementation indication TCAI constituting the telephone number add-on identification information TNAI is "1", "0" (step 105).

If toll number add-on implementation indication NCGI="0" and number conversion implementation indication TCAI="0" are found to hold, then known call connection processing is executed based upon the entered telephone number (step 106). If toll number add-on implementation indication NCGI="1" holds (FIGS. 14 through 16), then the subscriber call processing connection controller 33 executes processing from step 107 onward. If number conversion implementation indication TCAI="1" holds (FIG. 17), then the subscriber call processing connection controller 33 executes processing from step 301 onward.

If the result of discriminating the toll number add-on implementation indication NCGI and number conversion implementation indication TCAI is that toll number add-on implementation indication NCGI="1" holds, then it is determined whether the three entered digits make up a special service number (step 107). This decision can be made by referring to special service number indication data (not shown) contained in the translation data TRDT.

If the entered number is not a special service number, i.e., if the first three digits constitute a local office number (FIGS. 14, 15), then the subscriber call processing connection controller 33 executes processing from step 108 onward. If the entered number is a special service number (FIG. 16), then processing from step 201 onward is executed.

If the first three digits make up a local office number ("112" in the case of FIG. 14 and "221" in the case of FIG. 15), then the subscriber call processing connection controller 33 indexes the subscriber table 41 by the subscriber number (111-1001) of the originating subscriber (d) and extracts the normalized office code NOC that specifies the local area in which the originating subscriber (d) resides (step 108).

Next, the subscriber call processing connection controller 33 searches the normalized office code→toll number conversion table 43 using the normalized office code NOC obtained at step 108 and extracts the toll number (045) and local office number (5111) of the originating subscriber (step 109).

If the toll number (045) is extracted, then the subscriber call processing connection controller 33 adds this toll number onto the beginning of the dialed number (local office number 112 or 221) that has been received (step 110). As a result, "112" becomes "045 112" or "221" becomes "045 221".

Next, on the basis of the dialed number onto which the toll number has been added, the subscriber call processing connection controller 33 performs re-translation using the translation table 42 (step 111). In this case it is determined, based upon whether or not translation is possible, whether the terminating destination resides in the same area as that toll number of the originating subscriber (step 112). If the terminating destination does reside in the same area as that toll number of the originating subscriber, then the telephone number (045 112) onto which the toll number has been added actually exists. Accordingly, translation is possible and a connection between the originating subscriber and the terminating destination is established by known call connection processing (step 113). However, in the event that the terminating destination does not reside in the same area as that toll number of the originating subscriber, then the telephone number (045 221) onto which the toll number has been added does not exist. Translation is not possible, therefore, and the subscriber call processing connection controller 33 suspends call connection processing and connects the announcement device to the originating subscriber, thereby instructing the subscriber to dial in the number with the addition of the toll number (step 114).

The determination as to whether the terminating destination is in the same area as that of the toll number of the originating subscriber can be performed in the following manner as well: Since the normalized office code (NOC) of the originating subscriber and the normalized office code (NOC) of the terminating destination are ascertained from the subscriber table 41 and translation table (translation data), respectively (see FIGS. 14 and 15), the respective toll numbers and internal local office numbers can be compared upon being read out of the normalized office code→toll number conversion table 43 using these normalized office codes (NOCs). If the toll numbers of the terminating destination and originating subscriber match, or if the values at the beginning of the internal local office numbers match (FIG. 14), then the terminating destination and the originating subscriber exist in the same toll number area. However, if the toll numbers of the terminating destination and originating subscriber do not match, or if the values at the beginning of the internal local office numbers do not match (FIG. 15), then the terminating destination and the originating subscriber do exist in the same toll number area.

Accordingly, processing can also be executed as follows: It is determined through the foregoing processing whether the terminating destination and originating subscriber reside in the same toll number area (step 112). If the answer is "YES", then known call connection processing is executed by re-translation (step 113). If the answer is "NO", then call connection processing is terminated immediately and the originating subscriber is instructed to perform dialing with the inclusion of the toll number (step 114).

The foregoing is for a case where the first three digits of the dialed number constitute a local office number. However, if the first three digits of the dialed number constitute a special service number (=110) (FIG. 16), then the subscriber call processing connection controller 33 indexes the subscriber table 41 by the subscriber number (111-1001) of the originating subscriber (d) and extracts the normalized office code (NOC) that specifies the local area in which the originating subscriber (d) resides (step 201).

Next, the subscriber call processing connection controller 33 searches the normalized office code→toll number conversion table 43 using the normalized office code NOC obtained at step 201 and extracts the toll number (045) of the originating subscriber (step 202).

If the toll number (045) is extracted, then the subscriber call processing connection controller 33 adds this toll number onto the beginning of the dialed number (110) that has been received (step 203). As a result, "110" becomes "045 110". Next, on the basis of the dialed number 045 110 onto which the toll number has been added, the subscriber call processing connection controller 33 performs re-translation using the translation table 42, thereby connecting the originating subscriber (d) to the special service number reception center SNR1.

Accordingly, when operation is normal, the toll number add-on implementation indication NCGI conforming to the special service number 110 is set to "0" and, in response to dialing of the special service number by each subscriber, each subscriber is connected to the centralized special service number reception center SNR. If the connection between a subscriber and the centralized special service number reception center SNR has become impossible due to circumstances such as the occurrence of an earthquake, the toll number add-on implementation indication NCGI conforming to the special service number 110 in the translation table of the exchange EX is set to "1". As a result, if the subscriber dials the special service number, the subscriber will be connected to the special service number reception center of the same toll number area, thereby making it possible to notify the center of the event.

The foregoing is for a case where the first three digits of the dialed number constitute a local office number or special service number. However, if it is determined at step 105 that the first three digits are a special service number (e.g., 001) and the number conversion implementation indication TCAI conforming to this special service number is "1" (FIG. 17), then the subscriber table 41 is indexed by subscriber number (111-1001) of the originating subscriber (d) and the number conversion information index value NEX of the originating subscriber is extracted (step 301).

Next, the number conversion table 44 is searched using the number conversion information index value NEX obtained at step 301 and the number conversion information (002) is extracted (step 302).

If number conversion information (002) is extracted, then this number conversion information (002) is substituted for the received special service number (001) so that 001-xxxxxxxx is made 002-xxxxxxxx (step 303). Thereafter, re-translation is performed using 002-xxxxxxxx resulting from the special service number conversion and the international telephone service is implemented (step 304). As a result, services having different specifications can be implemented without modifying the number plan. In other words, in the example set forth above, the telephone number at the time of re-translation becomes "002-xxxxxxxx" so that the international service call (002), which differs from the international service call (001), can be implemented.

As set forth above, the number conversion information index value NEX is stored in the subscriber table 41 and the number conversion table 44 is searched based upon the number conversion information index value NEX to thereby extract the number conversion information. However, it can be so arranged that the number conversion information is placed in the subscriber data of subscriber table 41, thereby making it possible to dispense with the number conversion table 44.

Thus, in accordance with the present invention, a telephone number translation table is created in accordance with a telephone number structure comprising an internal toll number and internal local office numbers, wherein the internal toll number is a shared number segment shared by toll numbers in a plurality of areas having different toll numbers, and the internal local office numbers are numbers obtained by adding an unshared number segment from among the toll numbers in the plurality of areas having different toll numbers onto local office numbers that follow the unshared number. Switching service control is carried out using this translation table. As a result, even in a case where switching control for subscribers in a plurality of areas having different toll numbers is performed by a single exchange, an increase in the storage capacity of the data memory storing the translation table can be limited to the maximum degree.

In accordance with the present invention, it is so arranged that a call within the same toll number area can be made without dialing a toll number whereas a call between different toll number areas cannot be made unless a toll number is dialed. As a result, it is possible to prevent an erroneous connection in a case where identical local office numbers reside in different toll number areas.

In accordance with the present invention, it is so arranged that when the calling party and destination do not reside in the same toll number area, the calling party is instructed by voice to dial the telephone number with the inclusion of the toll number. Accordingly, even if switching control for subscribers in a plurality of areas having different toll numbers is performed by a single exchange, the service provided to the subscribers can be improved.

In accordance with the present invention, it is so arranged that when a call has been made from a telephone using a special service number, the toll number of the area in which the calling party resides is obtained and call connection processing is executed after the obtained toll number is added onto the beginning of the special service number. As a result, a subscriber can be connected to a special service number reception center in the same toll number area as that of the subscriber and the subscriber is thus allowed to communicate with the nearest special service number center.

In accordance with the present invention, it is so arranged that when a service number has been entered from a telephone, call connection processing is executed upon changing the service number by a number specified by a number or retrieved data that has been added onto subscriber data of the calling party. This makes it possible to implement services having different specifications on the basis of subscriber attributes even if service numbers are identical.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling connection of calls in an exchange which performs switching control for subscribers in a plurality of areas having different toll numbers, comprising the steps of:

adopting, as an internal toll number, a number segment shared by the toll numbers in the plurality of areas;

adopting, as internal local office numbers, numbers obtained by adding a number segment, which is not shared by the toll numbers in the plurality of areas, onto local office numbers that follow the number segment not shared;

creating a telephone number translation table in accordance with a telephone number structure comprising the internal toll number and the internal local office numbers; and performing call connection control using said telephone number translation table.

2. The method according to claim 1, further comprising the steps of:

storing toll number add-on implementation data in said telephone number translation table in correspondence with local office numbers, said toll number add-on implementation data indicating whether a toll number is to be added onto a local office number that has been transmitted from a telephone;

adding normalized office codes, which specify local areas in which subscribers reside, to a subscriber table holding subscriber data;

providing a normalized office code—toll number conversion table for storing toll numbers of local areas specified by the normalized office codes;

when a call has been made by a calling party from a telephone using a local office number, referring to the toll number add-on implementation data in said telephone number translation table to determine whether a toll number is to be added onto this local office number;

if the toll number is to be added on, obtaining the toll number of the local area in which the calling party resides from said subscriber table and said normalized office code—toll number conversion table; and executing call connection processing upon adding the obtained toll number onto the beginning of the local office number received from the telephone.

3. The method according to claim 2, further comprising the steps of:

determining whether a calling party and a called party reside in the same toll number area and executing call connection control if the calling party and called party reside in the same toll number area; and providing voice guidance to the calling party for prompting the calling party to dial the telephone number upon adding on a toll number if the calling party and called party do not reside in the same toll number area.

4. The method according to claim 1, further comprising the steps of:

storing toll number add-on implementation data in said telephone number translation table in correspondence with special service numbers, said toll number add-on implementation data indicating whether a toll number is to be added onto a special service number that has been transmitted from a telephone;

adding normalized office codes, which specify local areas in which subscribers reside, to a subscriber table holding subscriber data;

providing a normalized office code—toll number conversion table for storing toll numbers of local areas specified by the normalized office codes;

when a call has been make by a calling party from a telephone using a special service number, referring to the toll number add-on implementation data in said telephone number translation table to determine whether a toll number is to be added onto this special service number;

if the toll number is to be added on, obtaining the toll number of the local area in which the calling party resides from said subscriber table and said normalized office code—toll number conversion table; and executing call connection processing upon adding the obtained toll number onto the beginning of the special service number.

5. The method according to claim 1, further comprising the steps of:

storing number conversion implementation data in said telephone number translation table in correspondence with special service numbers, said number conversion implementation data indicating whether a special service number that has been transmitted from a telephone is capable of being converted to another number for subscriber support;

adding the other number or search data for retrieving the other number to a subscriber table holding subscriber data;

when a special service number has been entered from a telephone, referring to the number conversion implementation data to determine whether this special service number is capable of being converted to another number; and if conversion of the special service number to the other number is possible, executing call connection processing upon changing the entered special service number by the other number, or by a number specified by the search data, that has been added to the subscriber data of the calling party.

6. An exchange which performs call connection control for subscribers in a plurality of areas having different toll numbers, comprising:

a telephone number translation table created in accordance with a telephone number structure comprising an internal toll number and internal local office numbers, wherein the internal toll number is a number segment shared by toll numbers in the plurality of areas, and the internal local office numbers are numbers obtained by adding a number segment, which is not shared by the toll numbers in the plurality of areas, onto local office numbers that follow the number segment not shared; and a controller for performing call connection control using said telephone number translation table.

7. An exchange which performs call connection control for subscribers in a plurality of areas having different toll numbers, comprising:

a telephone number translation table created in accordance with a telephone number structure comprising an internal toll number and internal local office numbers, wherein the internal toll number is a number segment shared by toll numbers in the plurality of areas, and the internal local office numbers are numbers obtained by adding a number segment, which is not shared by the toll numbers in the plurality of areas, onto local office numbers that follow the number segment not shared, said telephone number translation table holding toll number add-on implementation data in correspondence with local office numbers, said toll number add-on implementation data indicating whether a toll number is to be added onto a local office number that has been transmitted from a telephone;

a subscriber table for holding subscriber data to which have been added normalized office codes specifying local areas in which subscribers reside;

a normalized office code—toll number conversion table for storing toll numbers of local areas specified by the normalized office codes; and a controller for referring to the toll number add-on implementation data in said telephone number translation table when a call has been made by a calling party from a telephone using a local office number, determining whether a toll number is to be added onto this local office number, obtaining the toll number of the local area in which the calling party resides from said subscriber table and said normalized office code—toll number conversion table if the toll number is to be added onto the local office number, and executing call connection processing upon adding the obtained toll number onto the beginning of the local office number received from the telephone.

8. An exchange which performs call connection control for subscribers in a plurality of areas having different toll numbers, comprising:

a telephone number translation table created in accordance with a telephone number structure comprising an internal toll number and internal local office numbers, wherein the internal toll number is a number segment shared by toll numbers in the plurality of areas, and the internal local office numbers are numbers obtained by adding a number segment, which is not shared by the toll numbers in the plurality of areas, onto local office numbers that follow the number segment not shared, said telephone number translation table holding toll number add-on implementation data in correspondence with special service numbers, said toll number add-on implementation data indicating whether a toll number is to be added onto a special service number that has been transmitted from a telephone;

a subscriber table for holding subscriber data and to which have been added normalized office codes specifying local areas in which subscribers reside;

a normalized office code—toll number conversion table for storing toll numbers of local areas specified by the normalized office codes; and a controller for referring to the toll number add-on implementation data in said telephone number translation table when a call has been made by a calling party from a telephone using a special service number, determining whether a toll number is to be added onto this special service number, obtaining the toll number of the local area in which the calling party resides from said subscriber table and said normalized office code—toll number conversion table if the toll number is to be added onto the special service number, and executing call connection processing upon adding the obtained toll number onto the beginning of the special service number.

9. An exchange which performs call connection control for subscribers in a plurality of areas having different toll numbers, comprising:

a telephone number translation table created in accordance with a telephone number structure comprising an internal toll number and internal local office numbers, wherein the internal toll number is a number segment shared by toll numbers in the plurality of areas, and the internal local office numbers are numbers obtained by adding a number segment, which is not shared by the toll numbers in the plurality of areas, onto local office numbers that follow the shared number segment, said telephone number translation table holding number conversion implementation data in correspondence with special service numbers, said number conversion implementation data indicating whether a special service number that has been transmitted from a telephone is capable of being converted to another number for subscriber support;

a subscriber table for holding subscriber data to which have been added the other numbers or search data for retrieving the other numbers; and a controller for referring to the number conversion implementation data in said telephone number translation table when a special service number has been entered from a telephone, determining whether this special service number is capable of being converted to another number and, if conversion of the special service number to the other number is possible, executing call connection processing upon changing the entered special service number by the other number, or by a number specified by the search data, that has been added to the subscriber data of the calling party.

* * * * *